(12) United States Patent
DeWald et al.

(10) Patent No.: US 11,133,516 B2
(45) Date of Patent: Sep. 28, 2021

(54) MULTI-REFORMABLE FUEL DELIVERY SYSTEMS AND METHODS FOR FUEL CELLS

(71) Applicant: WATT Fuel Cell Corp., Mount Pleasant, PA (US)

(72) Inventors: Paul DeWald, Scottdale, PA (US); Caine Finnerty, Mount Pleasant, PA (US)

(73) Assignee: WATT Fuel Cell Corp., Mount Pleasant, PA (US)

( * ) Notice: Subject to any disclaimer, the term of this patent is extended or adjusted under 35 U.S.C. 154(b) by 240 days.

(21) Appl. No.: 15/504,380

(22) PCT Filed: Aug. 14, 2015

(86) PCT No.: PCT/US2015/045257
§ 371 (c)(1),
(2) Date: Feb. 16, 2017

(87) PCT Pub. No.: WO2016/028630
PCT Pub. Date: Feb. 25, 2016

(65) Prior Publication Data
US 2017/0237093 A1 Aug. 17, 2017

Related U.S. Application Data

(60) Provisional application No. 62/038,936, filed on Aug. 19, 2014.

(51) Int. Cl.
*H01M 8/04* (2016.01)
*H01M 8/04746* (2016.01)
(Continued)

(52) U.S. Cl.
CPC ......... *H01M 8/04753* (2013.01); *C01B 3/386* (2013.01); *H01M 8/04268* (2013.01);
(Continued)

(58) Field of Classification Search
CPC .......... H01M 8/04753; H01M 8/0618; H01M 8/04268; C01B 3/386; C01B 2203/025;
(Continued)

(56) References Cited

U.S. PATENT DOCUMENTS 7,270,907 B2    9/2007  Becerra et al.
7,429,358 B1 *  9/2008  Gross ................. G01N 7/02
                                                  422/50

(Continued)

FOREIGN PATENT DOCUMENTS

WO         01/12539         2/2001

OTHER PUBLICATIONS

International Search Report (3 pages) and Written Opinion of the International Searching Authority (5 pages) for International Application No. PCT/US2015/045257.

*Primary Examiner* — Gary D Harris
(74) *Attorney, Agent, or Firm* — Goodwin Procter LLP

(57) ABSTRACT

The present teachings provide multi-reformable fuel delivery systems and methods that can deliver, without the use of a liquid pump, any hydrocarbon fuel, i.e., a liquid or gaseous reformable fuel, for example, to at least one of a reformer, a vaporizer, a fuel cell stack, an afterburner and other assemblies and components of a fuel cell unit or system, More specifically, gas pressure can be used to control and deliver gaseous reformable fuels and/or liquid reformable fuels in the delivery systems and methods of the present teachings. The delivery systems and methods also can apply to the delivery of a liquid reactant such as water and gaseous reactants such as an oxygen-containing gas (e.g., air) and steam.

7 Claims, 8 Drawing Sheets

(51) Int. Cl.
  *C01B 3/38* (2006.01)
  *H01M 8/0612* (2016.01)
  *H01M 8/04223* (2016.01)

(52) U.S. Cl.
  CPC ..... *H01M 8/0618* (2013.01); *C01B 2203/025* (2013.01); *C01B 2203/0233* (2013.01); *C01B 2203/0244* (2013.01); *C01B 2203/0261* (2013.01); *C01B 2203/066* (2013.01); *C01B 2203/1288* (2013.01); *C01B 2203/169* (2013.01)

(58) Field of Classification Search
  CPC ...... C01B 2203/0244; C01B 2203/169; C01B 2203/1288; C01B 2203/066; C01B 2203/0233; C01B 2203/0261
  USPC ......................................................... 429/423
  See application file for complete search history.

(56) References Cited

U.S. PATENT DOCUMENTS

| | | |
|---|---|---|
| 7,709,117 B2 | 5/2010 | Lee et al. |
| 2005/0058880 A1 | 3/2005 | Fujita et al. |
| 2007/0148528 A1* | 6/2007 | Sakai ................ H01M 8/04231 429/410 |
| 2007/0160879 A1 | 7/2007 | Kaye et al. |
| 2007/0264543 A1* | 11/2007 | Kim ........................ C01B 3/384 429/412 |

* cited by examiner

MULTI-REFORMABLE FUEL DELIVERY SYSTEMS AND METHODS FOR FUEL CELLS

CROSS-REFERENCE TO RELATED APPLICATIONS

This application is a U.S. national stage application under 35 U.S.C. § 371 of International Application No. PCT/US2015/045257, filed on Aug. 14, 2015, which claims priority to and the benefit of U.S. Patent Application No. 62/038,936, filed on Aug. 19, 2014, each of which is incorporated by reference herein in its entirety.

FIELD

The present teachings relate to liquid and gaseous reformable fuel delivery systems for fuel cell units or systems, methods of operating such delivery systems, and methods of controlling the flow and delivery of gaseous and liquid reformable fuels to components of a fuel cell unit or system.

BACKGROUND

The conversion of a gaseous reformable fuel and/or a liquid reformable fuel to a hydrogen-rich carbon monoxide-containing gas mixture, a product commonly referred to as "synthesis gas" or "syngas," can be carried out in accordance with any of such well known fuel reforming operations such as steam reforming, dry reforming, autothermal reforming, and catalytic partial oxidation reforming.

The development of improved fuel reformers, fuel reformer components, and reforming processes continues to be the focus of considerable research due to the potential of fuel cell systems or simply, "fuel cells," i.e., devices for the electrochemical conversion of electrochemically oxidizable fuels such as hydrogen, mixtures of hydrogen and carbon monoxide, for example, syngas, and the like, to electricity, to play a greatly expanded role for general applications including main power units (MPUs) and auxiliary power units (APUs). Fuel cells also can be used for specialized applications, for example, as on-board electrical generating devices for electric vehicles, backup and primary power sources for residential-use devices, main power sources for leisure-use, outdoor and other power-consuming devices in out-of-grid locations, and lighter weight, higher power density, ambient temperature-independent replacements for portable battery packs.

Because large scale, economic production of hydrogen, infrastructure required for its distribution, and practical means for its storage (especially as a transportation fuel) are widely believed to be a long way off, much current research and development has been directed to improving both fuel reformers as sources of electrochemically oxidizable fuels, notably mixtures of hydrogen and carbon monoxide, and fuel cell assemblies, commonly referred to as fuel cell "stacks," as convertors of such fuels to electricity, and the integration of fuel reformers and fuel cells into more compact, reliable and efficient devices for the production of electrical energy.

With these considerations in mind, the storage and delivery of reformable fuels to components of a fuel cell system such as a vaporizer and a fuel reformer is another area where development is needed. For example, the ability of a single delivery system and methods to deliver efficiently and in a readily controllable manner both gaseous reformable fuels and liquid reformable fuels to a vaporizer and a reformer for conversion into a hydrogen-rich product for use by a fuel cell stack is desired. Thus, there is a need to improve systems for and methods of delivery of both gaseous and liquid reformable fuels to components of a fuel cell unit or system.

SUMMARY

In light of the foregoing, the present teachings provide multi-reformable fuel (i.e., liquid and gaseous reformable fuels) delivery systems and methods that can deliver, without the use of a liquid pump, any hydrocarbon fuel, i.e., a liquid or gaseous reformable fuel, for example, to at least one of a vaporizer, a reformer, a fuel cell stack, and other components of a fuel cell unit or system. More specifically, the delivery systems and methods of the present teachings use gas pressure to control and deliver gaseous reformable fuels and/or liquid reformable fuels to the components of a fuel cell unit or system. That is, gas pressure is used to deliver the gaseous reformable fuels and to displace and deliver the liquid reformable fuels. Consequently, the delivery systems and methods of the present teachings can use an appropriate balance of gas pressure throughout a delivery system, which balance can provide a metered flow rate of a liquid reformable fuel and/or a gaseous reformable fuel to a desired downstream component of a fuel cell unit or system.

According to the present teachings, one common delivery system independently can control the proportions of gaseous reformable fuel and liquid reformable fuel delivered to components of a fuel cell unit or system. For example, the delivery systems of the present teachings can enable appropriate mixing of gaseous and liquid reformable fuels for start-up, steady-state, and shut-down modes of a fuel cell unit or system. The delivery systems and methods of the present teachings can deliver an oxygen-containing gas to a reformable fuel to provide an appropriate oxygen to fuel ratio for reforming.

Further, the delivery systems can be used and the methods can be practiced without the limitations of liquid pumps. As a result, the multi-reformable fuel delivery systems of the present teachings can be operated at lower system pressures. The delivery systems can reduce the load on the balance of plant during start-up mode. The delivery systems also can have an increased control range for fluid flow rates throughout the delivery system.

In addition, control of the flow and delivery of a gaseous reformable fuel is usually independent of the control of the flow and delivery of a liquid reformable fuel, thereby requiring two independent delivery control systems. In such a case, the variations from system to system can impact the efficient operation of a fuel cell unit or system because of the variations between the two control systems as well as the required calibration of the two systems. The relatively simple configuration of the delivery systems of the present teachings can avoid the use of two independent control systems and their inherent limitations.

Moreover, the delivery systems of the present teachings can have separate and dedicated routing (e.g., conduit) systems for gaseous reformable fuel and for liquid reformable fuel. Such an arrangement can prevent cross-contamination of structure and components, for example, valve assemblies, by directing or delivering only one type of reformable fuel therethrough. Such an arrangement can limit the exposure of sensitive structure and components such as pump or compressor seals and valves to liquid fuels.

Also the delivery systems can include operable fluid communication between the gaseous headspace of a liquid reformable fuel reservoir and at least one of a vaporizer, a reformer, a fuel cell stack, and an afterburner, for example, via a pressure relief valve assembly associated with the gaseous headspace. Methods of the present teachings can include exploiting such a feature, for example, delivering the gas including vaporized liquid reformable fuel in the headspace as well as any gaseous reformable fuel from a source of gaseous reformable fuel that might be present, to a component of a fuel cell unit for consumption and use of the energy that otherwise would be vented to the atmosphere through a pressure relief valve.

The delivery systems also can be associated with a larger, primary source of liquid reformable fuel to refill a liquid reformable fuel reservoir. Such an arrangement can provide for near continuous operation of a fuel cell unit or system and/or for refilling of a portable/mobile fuel cell unit or system. The use of such a primary source of liquid reformable fuel can minimize the variation in the quality of the liquid reformable fuel used by a fuel cell stack to which it is delivered. In addition, the use of a larger, primary source of liquid reformable fuel can minimize or prevent the introduction of sediment and other higher density impurities into the fluid stream(s) of a fuel cell unit or system.

Thus, in one aspect, the present teachings provide multi-reformable fuel delivery systems for delivering liquid and gaseous reformable fuels to components of a fuel cell unit or system, for example, to at least one of a vaporizer, a reformer, a fuel cell stack, and an afterburner.

The delivery systems generally include a liquid reformable fuel reservoir, where the interior of the liquid reformable fuel reservoir includes a liquid reformable fuel space and a gaseous headspace; a source of a gaseous reformable fuel, where the source of a gaseous reformable fuel is in operable fluid communication with at least one of a vaporizer, a reformer, a fuel cell stack and an afterburner of a fuel cell unit or system, and in operable fluid communication with the gaseous headspace of the liquid reformable fuel reservoir; and a vaporizer, where the vaporizer is in operable fluid communication with an outlet of the liquid reformable fuel space and in operable fluid communication with at least one of an inlet of a reformer, an inlet of a fluid mixing device, and an inlet of a fuel cell stack.

In various embodiments, the delivery systems can include a source of positive gas pressure different from the source of gaseous reformable fuel, where the source of positive gas pressure is in operable fluid communication with the gaseous headspace of the liquid reformable fuel reservoir. The liquid reformable fuel reservoir can include a pressure relief valve assembly in operable fluid communication with the gaseous headspace to assist in controlling the fluid pressure and delivery of fluids throughout the delivery system. The pressure relief valve assembly can be in operable fluid communication with at least one of a vaporizer, a reformer, a fuel cell stack, and an afterburner, for example, to provide the gas from the gaseous headspace to a component of a fuel cell unit or system.

In certain embodiments, the delivery systems and methods of the present teachings can exclude a valve assembly and conduit(s) directly coupling the source of gaseous reformable fuel with the gaseous headspace of the liquid reformable fuel reservoir. In such embodiments, a liquid and gaseous reformable fuel delivery system can include a liquid reformable fuel reservoir, where the interior of the liquid reformable fuel reservoir includes a liquid reformable fuel space and a gaseous headspace and the liquid reformable fuel space is in operable fluid communication with a vaporizer and/or a fluid mixing device of a fuel cell unit; a source of positive gas pressure, where the source of positive gas pressure is in operable fluid communication with the gaseous headspace of the liquid reformable fuel reservoir; and a source of a gaseous reformable fuel, where the source of a gaseous reformable fuel is in operable fluid communication with at least one of a vaporizer, a reformer, a fuel cell stack, and an afterburner of a fuel cell unit.

In some embodiments, the delivery systems include a source of oxygen-containing gas, for example, to mix with a reformable fuel for creating an appropriate ratio oxygen to fuel for reforming. The delivery systems can include a fluid mixing device for mixing fluid reactants such as a reformable fuel, an oxygen-containing gas and/or steam, in particular applications. One of more inlets of a fluid mixing device can be in fluid communication with at least one of a source of a gaseous reformable fuel, a source of a liquid reformable fuel including a vaporized liquid reformable fuel, an oxygen-containing gas, and steam. An outlet of a fluid mixing device can be in operable fluid communication with reformer and/or a fuel cell stack.

In certain embodiments, the delivery systems can be associated with and coupled to a fuel cell unit or system. The fuel cell unit or system can include a fuel cell stack and an afterburner. The fuel cell unit or system also can be considered to include a reformer and/or a vaporizer.

In another aspect, the present teachings provide methods for operating the multi-reformable fuel delivery systems of the present teachings. For example, the methods can include adjusting the gas pressure between or among two of more of a source of gaseous reformable fuel, a gaseous headspace of the liquid reformable fuel reservoir, a liquid reformable fuel space of the liquid reformable fuel reservoir, a vaporizer, a reformer, a fuel cell stack and an afterburner, to control the delivery of gaseous reformable fuel from the source of gaseous reformable fuel to the gaseous headspace of the liquid reformable fuel reservoir and to at least one of the vaporizer, the reformer, the fuel cell stack and the afterburner, and the delivery of liquid reformable fuel from the liquid reformable fuel reservoir to the vaporizer, such as by adjusting or manipulating one or more valve assemblies and one or more source(s) of gaseous reformable fuel and source(s) of positive gas pressure including sources of oxygen-containing gas.

In various embodiments, the methods of the present teachings include controlling the flow and delivery of gaseous and liquid reformable fuels to a fuel cell unit or system without the use of a liquid pump. The methods can include delivering gaseous reformable fuel to at least one of a vaporizer, a fluid mixing device, a reformer, a fuel cell stack, and an afterburner; and applying positive gas pressure to a gaseous headspace of a liquid reformable fuel reservoir to at least one of: (a) deliver liquid reformable fuel to a vaporizer and/or a fluid mixing device; and (b) deliver gas from the gaseous headspace to at least one of a vaporizer, a fluid mixing device, a reformer, a fuel cell stack, and an afterburner. In some embodiments, the liquid reformable fuel does not pass through conduits in which gaseous reformable fuel passes. In particular embodiments, vaporized liquid reformable fuel can mix with an oxygen-containing gas and/or a gaseous reformable fuel prior to introduction into the reformer and/or the fuel cell stack.

As a variation of an aspect, methods of the present teachings can be described independent of the specific delivery structure and components recited herein. To that end, the methods of the present teachings can include controlling the delivery of gaseous and liquid reformable fuels to a fuel cell unit or system without the use of a liquid pump, where the method can include using a first positive gas pressure to displace and deliver liquid reformable fuel to a vaporizer and/or a fluid mixing device; and using a second positive gas pressure to deliver a gaseous reformable fuel to at least one of a vaporizer, a fluid mixing device, a reformer, a fuel cell stack, an afterburner, a steam of oxygen-containing gas, and a stream of vaporized liquid reformable fuel. In certain embodiments, the first positive gas pressure and the second positive gas pressure can be the same, for example, the positive gas pressure can be from the same or a single source of positive gas pressure.

The methods of the present teachings can include delivering an oxygen-containing gas to at least one of a stream of liquid reformable fuel, a vaporizer, a stream of vaporized liquid reformable fuel, a stream of gaseous reformable fuel, a fluid mixing device, a reformer, a fuel cell unit, and an afterburner. The methods described herein also can include delivering a mixture of a reformable fuel such as a liquid reformable fuel and/or a gaseous reformable fuel and an oxygen-containing gas to a reformer and/or a fuel cell stack.

The foregoing as well as other features and advantages of the present teachings will be more fully understood from the following figures, description, examples, and claims.

DESCRIPTION OF DRAWINGS

It should be understood that the drawings described below are for illustration purposes only. Like numerals generally refer to like parts. The drawings are not necessarily to scale, with emphasis generally being placed upon illustrating the principles of the present teachings. The drawings are not intended to limit the scope of the present teachings in any way.

DETAILED DESCRIPTION

Figure 1A:
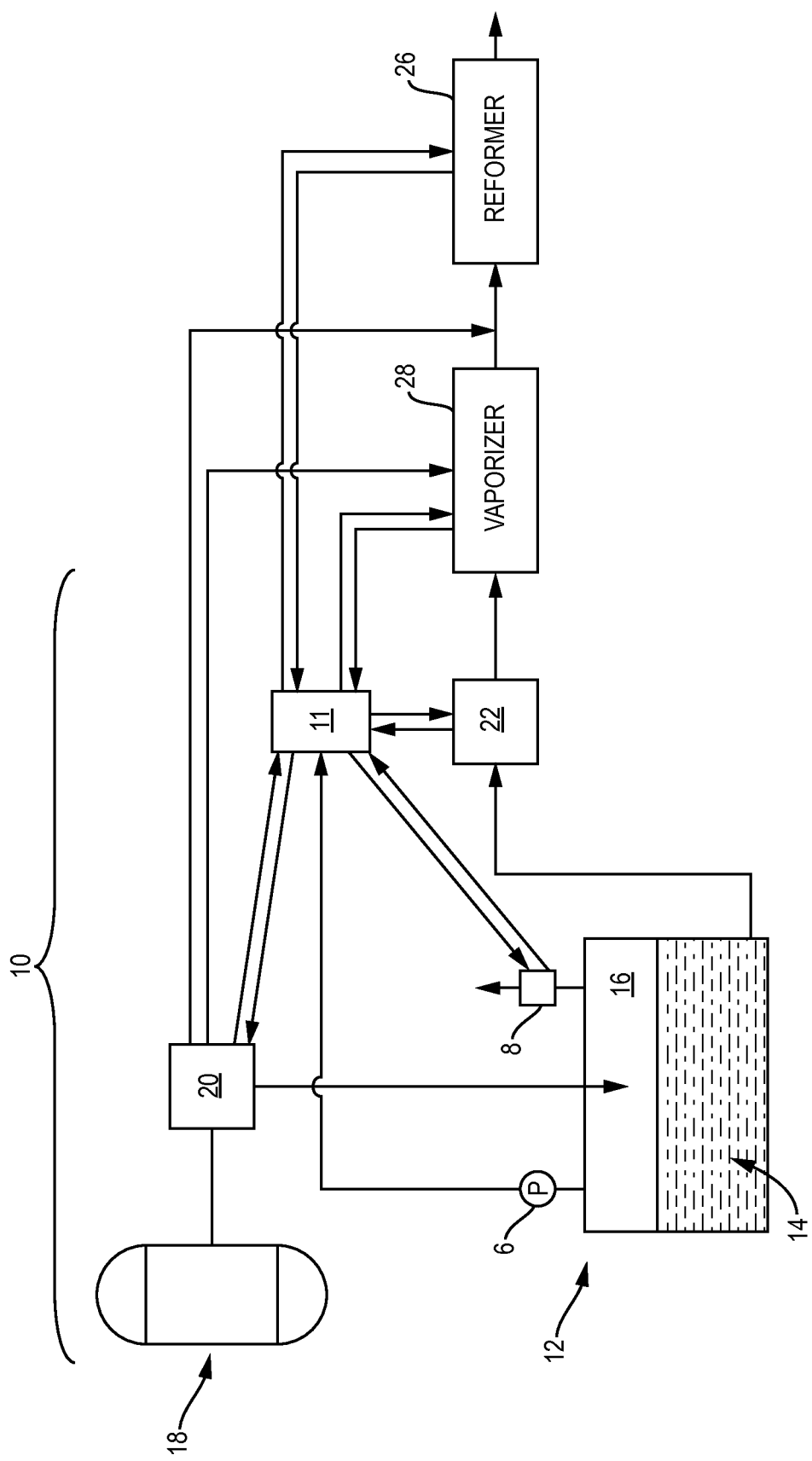
FIG. 1A is a schematic diagram of an embodiment of a liquid and gaseous reformable fuel delivery system of the present teachings where a single source of gaseous reformable fuel, for example, a compressed gas, is used to flow and deliver gaseous reformable fuel and liquid reformable fuel through the delivery system, which includes three valve assemblies and a controller.

It now has been discovered that gaseous reformable fuels and liquid reformable fuels can be delivered to at least one of a vaporizer, a reformer, a fuel cell stack, an afterburner, and other components of a fuel cell unit or system with the use of positive gas pressure to deliver the fluids, i.e., gases and liquids, for example, through a delivery system. Accordingly, gaseous and liquid reformable fuel delivery systems and methods of the present teachings can operate or can be carried out without the use of liquid pumps. Consequently, flow and delivery of gaseous and liquid reformable fuels can be independent of liquid pump capabilities and characteristics such as fixed displacement and flow rate adjustment. Moreover, some pumps and valves can be inappropriate for use with liquid fuels, for example, certain polymers used in diaphragm pumps can become stiff and brittle when exposed to liquid hydrocarbons. Polymer seals also can deteriorate upon exposure to certain hydrocarbons, leading to the need to replace the seal materials with more expensive options such as Viton® or the implementation of more expensive media-isolated devices. In addition, liquid pumps can be expensive and are inappropriate for use with gaseous reformable fuels.

An appropriate balance of gas pressure such as positive gas pressure throughout the delivery system can be achieved with the adjustment of the gas pressure between or among the components of the delivery system. For example, adjustment of the gas pressure between or among components can be achieved with the use and adjustment of a valve assembly or other delivery or flow control mechanisms, typically positioned between or among the components to which the valve assembly is in fluid communication. Consequently, the delivery of gaseous and/or liquid reformable fuel(s) can be tailored to the particular needs of a vaporizer, a reformer or a fuel cell stack (e.g., for "on-cell" reforming whereby a reforming catalyst is incorporated into the fuel electrodes of a fuel cell stack) and the particular application.

For example, the ratio of gaseous reformable fuel to liquid reformable fuel delivered to a vaporizer, a reformer, a fuel cell stack and combinations thereof can be controlled depending on whether the fuel cell unit or system is in a start-up, steady-state, or shut-down mode. Such ratio can be adjusted as the start-up mode progresses to the steady-state mode as well as when the steady-state mode progresses to the shut-down mode. The delivery systems and methods of the present teachings can include operable fluid communication between the gaseous headspace of a liquid reformable fuel reservoir and one or more of the vaporizer, the reformer, the fuel cell stack, and the afterburner. An oxygen-containing gas present in the gaseous headspace of the liquid reformable fuel reservoir (e.g., from a source of positive gas pressure that is pressurizing the gaseous headspace) can be delivered such as bled through a pressure relief valve assembly, to one or more of the vaporizer, the reformer, and the fuel cell stack, to provide or supplement the oxygen needed for the reforming reaction.

More specifically, although either one of a gaseous reformable fuel and a liquid reformable fuel can be used to operate a fuel cell unit or system, the ability to use both types of reformable fuels with a reformer and/or fuel cell stack and associated fuel cell unit or system can be optimal. For example, when in start-up mode of a fuel cell unit or system, gaseous reformable fuels can be used to start the reforming and other chemical reactions when the fuel cell unit or system is cold. After the chemical reactions are initiated, heat usually is generated and the fuel cell unit or system and its components begin to warm up and achieve their operating temperature. When in a steady-state mode, the heat generated by the reactions in the fuel cell unit or system can be used to heat the liquid reformable fuel prior to its introduction to a vaporizer, which typically is coupled to a reformer. Thus, use of liquid reformable fuel typically is preferred during steady-state mode due to its higher energy to weight/volume and its accessibility and storage. However, there are applications and circumstances when a fuel cell unit or system can be operated advantageously using gaseous and liquid reformable fuels simultaneously.

For brevity, the discussion and description herein will mainly focus on partial oxidation reforming reactions and reactants including catalytic partial oxidation reforming reactions and reactants (a reformable fuel and an oxygen-containing gas). However, the devices, assemblies, systems and methods described herein can apply to other reforming reactions such as steam reforming and autothermal reforming and their respective reactants (a reformable fuel and steam, and a reformable fuel, steam and an oxygen-containing gas, respectively). Accordingly, where an oxygen-containing gas is referenced herein in connection with a device or method, the present teachings should be considered as including steam in combination or alone, i.e., an oxygen-containing gas and/or steam, unless explicitly stated otherwise or understood by the context. In addition, where a reformable fuel is referenced herein in connection with a device or method, the present teachings should be considered as including steam in combination or alone, i.e., a reformable fuel and/or steam, unless explicitly stated otherwise or as understood by the context.

In addition, the liquid and gaseous reformable fuel delivery systems and methods of the present teachings should be understood to be suitable for delivery of liquid and/or gaseous reactants to carry out steam reforming and auto thermal reforming, for example, the delivery, control and management of a multi-reactant fluid delivery system to occur within the same structure and components and/or with the same general methods as described herein. That is, the delivery systems and methods of the present teachings can deliver the appropriate liquid reactants, for example, liquid reformable fuel and/or liquid water, from a liquid reformable fuel reservoir to a vaporizer to create a vaporized liquid reformable fuel and steam, respectively, and the appropriate gaseous reactants, for example, at least one of an oxygen-containing gas, a gaseous reformable fuel and steam, from their respective sources to a desired component of a fuel cell unit or system. In other words, various liquid reactants can be delivered through the liquid delivery part of the system and various gaseous reactants can be delivered through the gas delivery part of the system.

Accordingly, a liquid reformable fuel reservoir can include water (as a liquid) in its liquid reformable fuel space, which water can be displaced to a vaporizer by positive gas pressure in the gaseous headspace of the liquid reformable fuel reservoir. In such a case, a gaseous reformable fuel can be mixed with steam from the vaporizer to provide a gaseous steam reforming reaction mixture suitable for reforming in a reformer and/or a fuel cell stack. Consequently, in certain embodiments, a "liquid reformable fuel reservoir" can be replaced with a "water reservoir" having a "water space," or more generally, with a "liquid reactant reservoir" having a "liquid reactant space." To that end, for AT reforming, a liquid reactant can be water and/or a liquid reformable fuel, and a gaseous reactant can be at least one of a vaporized liquid reformable fuel, a gaseous reformable fuel, an oxygen-containing gas, and steam.

Where water is used in the delivery system, recycled heat from one or more of a reformer, a fuel cell stack and an afterburner of a fuel cell unit or system can be used to vaporize the water to create steam, which can be present in the delivery system and/or introduced into the delivery system from an independent source. In certain embodiments, the steam can be used to provide the pressure in the gaseous headspace of a liquid reformable fuel reservoir (or a water reservoir) thereby to drive or displace the liquid reformable fuel or water to a vaporizer rather than using the source of gaseous reformable fuel and/or a source of positive gas pressure such as a blower, pump or compressor. In particular embodiments, the pressure relief valve assembly can bleed the steam from the pressurized gaseous headspace to one or more of a fluid mixing device, a reformer and a fuel cell stack to aid in the reforming reaction and process.

Further, a delivery system of the present teachings can include two or more liquid reformable fuel reservoirs. In various embodiments, a delivery system can include a liquid reformable fuel reservoir and a water reservoir, (or two liquid reactant reservoirs). Each liquid reactant reservoir can be independently controlled to deliver their respective liquids to one or more vaporizers and/or directly to a reformer and/or a fuel cell stack such as through a fluid mixing device that can introduce a sufficient amount of oxygen-containing gas to the fluid stream, if needed. Such an arrangement of two or more liquid reactant reservoirs can reduce the risk of flashing.

Independent control of the delivery of a liquid reactant such as a reformable fuel or water can be achieved in part, using a pressure relief valve associated with each liquid reactant reservoir. Other factors affecting the delivery of liquids from the liquid reactant reservoirs can include the pressure delivered to the gaseous headspace of each liquid reactant reservoir, for example, by one or more sources of gaseous reformable fuel and/or one or more sources of positive gas pressure, the foregoing which are in operable fluid communication with the gaseous headspace(s). In particular embodiments, one source of positive gaseous pressure other than the source of gaseous reformable fuel can be used to pressurize the headspaces of the respective number of liquid reactant reservoirs, which are in operable fluid communication with the one source of positive gaseous pressure.

In sum, it should be understood that the delivery systems of the present teachings can deliver the appropriate reactants for carrying out reforming reactions including partial oxidation ("POX") reforming such as catalytic partial oxidation ("CPOX") reforming, steam reforming, and autothermal ("AT") reforming. The liquid reactants such as liquid reformable fuels and water can be delivered from and through the "liquid reformable fuel" delivery components, conduits, and assemblies of the delivery system. The gaseous reactants such as gaseous reformable fuels, steam, and an oxygen-containing gas such as air can be delivered from and through the "gaseous reformable fuel" delivery components, conduits, and assemblies of the delivery system. Certain gaseous reactants such as steam and an oxygen-containing gas can be delivered from and through components and assemblies that are peripheral or secondary to the delivery systems of the present teachings, for example, an oxygen-containing gas can be delivered from a source of oxygen-containing gas that is independently in operable fluid communication with at least one of a vaporizer, a reformer, and a fuel cell stack of a fuel cell unit or system, for example, to mix with a liquid reformable fuel and/or a vaporized liquid reformable fuel prior to reforming.

In addition, the various arrangements of the delivery systems and associated structure and components can include a fluid mixing device such as a static mixer or a fluid mixing device such as described in co-pending, co-owned U.S. patent application Ser. No. 14/335,463, entitled, "Mixing Reformable Fuels and an Oxygen-Containing Gas and/or Steam," which is incorporated by reference herein for all purposes. A fluid mixing device can be used to mix two or more of a reformable fuel, an oxygen-containing gas, and steam. The reformable fuel can be one or more of a liquid reformable fuel from a source of liquid reformable fuel, a vaporized liquid reformable fuel from a vaporizer, a gaseous reformable fuel from a source of gaseous reformable fuel. The fluid mixing device can be positioned appropriately in relation to the fluid streams to be mixed. For example, where mixing a liquid reformable fuel and an oxygen-containing gas is desired, one or more inlets of the fluid mixing device can be positioned to be in operable fluid communication with a source of liquid reformable fuel and a source of an oxygen-containing gas, and an outlet of the fluid mixing device can be positioned to be in operable fluid communication with a reformer and/or a fuel cell stack.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition, an apparatus, or a method described herein can be combined in a variety of ways without departing from the spirit and scope of the present teachings, whether explicit or implicit herein. For example, where reference is made to a particular structure, that structure can be used in various embodiments of apparatus of the present teachings and/or in methods of the present teachings, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

It should be understood that the expression "at least one of" includes individually each of the recited objects after the expression and the various combinations of two or more of the recited objects unless otherwise understood from the context and use.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

At various places in the present specification, values are disclosed in groups or in ranges. It is specifically intended that the description include each and every individual subcombination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

The use of any and all examples, or exemplary language herein, for example, "such as," "including," or "for example," is intended merely to illustrate better the present teachings and does not pose a limitation on the scope of the invention unless claimed. No language in the specification should be construed as indicating any non-claimed element as essential to the practice of the present teachings.

Terms and expressions indicating spatial orientation or altitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of apparatus, devices, components, and features of the present teachings that may be illustrated in certain of the accompanying figures.

As used herein, "liquid reformable fuel" refers to and includes reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

As used herein, "gaseous reformable fuel" refers to and includes reformable carbon- and hydrogen-containing fuels that are a gas at STP conditions, for example, methane, ethane, propane, butane, isobutane, ethylene, propylene, butylene, isobutylene, dimethyl ether, their mixtures, such as natural gas and liquefied natural gas (LNG), which are mainly methane, and petroleum gas and liquefied petroleum gas (LPG), which are mainly propane or butane but include all mixtures made up primarily of propane and butane, and the like, that when subjected to reforming undergo conversion to hydrogen-rich reformates. A gaseous reformable fuel also includes ammonia, which like other gaseous reformable fuels, can be stored as a liquid.

As used herein, a "reformable fuel" refers to a liquid reformable fuel and/or a gaseous reformable fuel.

As used herein, "gaseous reforming reaction mixture" refers to a mixture including a gaseous liquid reformable fuel (e.g., a vaporized liquid reformable fuel), a gaseous reformable fuel or combinations thereof; and an oxygen-containing gas (e.g., air) and/or water (e.g., in the form of steam). A gaseous reforming reaction mixture can be subjected to a reforming reaction to create a hydrogen-rich product ("reformate"), which also can contain carbon monoxide. Where a catalytic partial oxidation reforming reaction is to be carried out, the gaseous reforming reaction mixture can be referred to a "gaseous CPOX reforming reaction mixture," which includes a reformable fuel and an oxygen-containing gas. Where a steam reforming reaction is to be carried out, the gaseous reforming reaction mixture can be referred to as a "gaseous steam reforming reaction mixture," which includes a reformable fuel and steam. Where an autothermal reforming reaction is to be carried out, the gaseous reforming reaction mixture can be referred to as a "gaseous AT reforming reaction mixture," which includes a reformable fuel, an oxygen-containing gas and steam.

As used herein, a "fuel cell stack" refers to the component of a fuel cell unit or fuel cell system where the electrochemical reaction takes place to convert hydrogen or electrochemically-oxidizable species to electricity. The fuel cell stack includes an anode, a cathode, and an electrolyte, often formed in layers. In operation, hydrogen and any other electrochemically oxidizable component(s) of a reformate entering a fuel cell stack, for example, from a reformer and/or a fluid mixing device of the present teachings, combine with oxygen anions within an anode layer of the fuel cell stack to produce water and/or carbon dioxide and electrons. The electrons generated within the anode layer migrate through the external load and back to the cathode layer where oxygen combines with the electrons to provide oxygen anions which selectively pass through the electrolyte layer and the anode layer.

As used herein, a "fuel cell unit" generally refers to a reformer in operable fluid communication with a fuel cell stack, a fuel cell stack, and an afterburner in operable fluid communication with exhaust from the fuel cell stack. A fuel cell unit can include a vaporizer, where an outlet of the vaporizer is in operable fluid communication with an inlet of the reformer and/or the fuel cell stack. A fuel cell unit can include various valve assemblies, sensor assemblies, conduits, and other components associated with such a unit. A "fuel cell system" generally refers to a fuel cell unit and the balance of plant. A fuel cell system often includes a plurality of fuel cell units. A plurality of fuel cell units can share the balance of plant. However, it should be understood that a "fuel cell unit" and a "fuel cell system" can be used interchangeably herein unless the context dictates otherwise.

As used herein, "in operable fluid communication with" refers to fluid communication between or among various components and/or structure when the components and/or structure are in an operative or active state or position; however, fluid communication can be interrupted when the components and/or structure are in an inoperative or inactive state or position. Operable fluid communication can be controlled by a valve assembly positioned between or among components and/or structure. For example, if A is in operable fluid communication with B via a valve assembly, then fluid can flow or be delivered from A to B when the valve assembly is "open" thereby permitting fluid communication between A and B. However, fluid communication between A and B can be interrupted or ceased when the valve assembly is "closed." In other words, the valve assembly is operable to provide fluid communication between A and B. It should be understood that fluid communication can include various degrees and rates of fluid flow and related characteristics. For example, a fully-opened valve assembly can provide fluid communication between or among components and/or structure as can the valve assembly when it is partially-closed; however, the fluid flow characteristics such as flow rate can be affected by the different positions of the valve assembly. As used herein, "in operable fluid communication with" and "in fluid communication with" can be used interchangeably unless the context dictates otherwise.

As used herein, to "control the flow," "control the delivery," "adjust the flow," and "adjust the delivery" of a fluid, including grammatical equivalents and equivalent expressions and language, can be to increase the flow or delivery of fluid, to decrease the flow or delivery of fluid, to maintain a substantially constant flow or delivery of fluid, and/or to interrupt or cease the flow or delivery of fluid.

Similarly, to "control the pressure" and "adjust the pressure," including grammatical equivalents and equivalent expressions and language, can be to increase the pressure, to decrease the pressure, to maintain a substantially constant pressure, and/or to interrupt or cease the pressure. It should be understood that in many circumstances, to "control the flow" and "adjust the flow" can be to "control the pressure" and "adjust the pressure," and vice versa. In addition, "controlling," "adjusting," and "manipulating" a component of a delivery system, a fuel cell unit, or a fuel cell system (including grammatical equivalents and equivalent expressions and language), for example, a valve assembly or a source of positive gaseous pressure, can effect the same changes and/or steady-state operation as described above.

As used herein, a "valve assembly" refers to a structure or structures together that can monitor and/or control fluid communication and fluid flow characteristics between or among components and/or structure, for example, the delivery of propane from a source of propane to a reformer. A valve assembly can be a single valve or include a plurality of valves and related structure, where certain structures can be in series. A valve assembly can be or include a pressure metering assembly. For example, a valve assembly can be or include a metering valve thereby permitting digital control of the flow and delivery of fluids. A valve assembly can be or include valves in a piccolo arrangement, for example, a series of orifices, each associated with a proportional valve. A valve assembly can include a proportional valve such as a proportional solenoid valve; or a series of proportional valves such as a series of proportional solenoid valves. A valve assembly can include an on/off valve such as a solenoid valve; or a series of on/off valves, for example, a series of on/off solenoid valves. A valve assembly can include a three-way valve; a series of three-way valves; a check valve; a series of check valves; an orifice; a series of orifices; and combinations thereof and of the other valves and valve assemblies described herein, where certain of the valves and valve assemblies can be in series. Where structures or components are indicated as being in series, the components can be either in a parallel series or in a sequential series (e.g., collinear).

As used herein, a "sensor assembly" refers to any suitable sensor or sensing device or combination of sensor or sensing devices for the operating parameter(s) being monitored, measured and/or determined. For example, fuel flow rates can be monitored with any suitable flow meter, pressures can be monitored with any suitable pressure-sensing or pressure-regulating device, and temperatures can be monitored with any suitable temperature sensor. Accordingly, examples of sensor devices include flow meters, pressure meters, thermocouples, thermistors, and resistance temperature detectors. A sensor assembly can be a fluid flow differential pressure sensor or gauge, or simply, a differential pressure measurement assembly. A differential pressure measurement assembly typically includes two pressure taps. A differential pressure measurement assembly can include or be associated with a valve assembly such as orifice or a proportional valve (assembly) such that the pressure of the fluid before entering the valve or valve assembly is measured and the pressure after the fluid exits the valve or valve assembly is measured and the difference determined. A sensor or sensing device can include a balance, a weighing scale such as a spring scale, or other device for monitoring, measuring, and/or determining the weight of an object. The sensor assemblies optionally can include a transducer in communication with the controller.

As used herein, a "source of positive gaseous pressure" or a "source of positive gas pressure" refers to device or apparatus that can produce a positive gaseous or gas pressure or cause gas movement. A source of positive gas pressure can be a positive displacement blower, pump or compressor, or a dynamic blower, pump or compressor. Examples of sources of positive gaseous or gas pressure include a fan, a plurality or series of fans, a rotary pump or compressor, such as a rotary vane pump or compressor, a plurality or a series of rotary pumps or compressors, a reciprocating pump or compressor such as a diaphragm pump or compressor, or a plurality or a series of diaphragm pumps or compressors, a blower, for example, a centrifugal blower or compressor, a plurality or series of blowers, a plurality or series of centrifugal blowers or compressors, an air pump, a container of compressed gas such as a tank of air or an inert gas, and combinations thereof. A "positive gaseous pressure" or a "positive gas pressure" can be realized from any of these sources of positive gas pressure and others known to those skilled in the art. A "source of oxygen-containing gas" can be a source of positive gas pressure where the gas includes oxygen. A source of oxygen-containing gas can be a fluid stream delivered by a source of positive gas pressure, where the fluid stream including oxygen such as from the ambient environment or atmosphere and/or from one or more components of a fuel cell unit and/or system.

Liquid and gaseous reformable fuel delivery systems of the present teachings can include various conduits. A delivery system and its peripheral components can include a plurality of conduits, for example, two or more conduits, positioned to provide operable fluid communication between or among components of the delivery system and its peripheral components. For example, a plurality of conduits can couple a delivery system to components of a fuel cell system as well as couple the fuel cell system components themselves. That is, the components of the delivery systems and methods of the present teachings including peripheral components and devices can include conduits connecting or linking the components, for example, a liquid reformable fuel reservoir, a source of gaseous reformable fuel, a source of positive gas pressure, a reformer, a vaporizer, a fluid mixing device, a fuel cell stack, an afterburner, a source of oxygen-containing gas, a source of liquid reformable fuel, the first and second valve assemblies, a third, a fourth and sequentially higher or other valve assemblies, sensor assemblies, and related equipment such as pumps. Each of these components and others can include one or more of an inlet, an outlet, and a port to permit fluid communication, for example, operable fluid communication, to be established between or among the components. It also should be understood that the conduits can include other components and devices associated therewith, for example, valve assemblies, pumps, sources of positive gaseous pressure, and sensor assemblies.

The conduits or conduit system can have many specific designs, configurations, arrangements, and connections depending on many factors, for example, the particular application, the reformable fuel, and the footprint size of the overall delivery system and/or fuel cell unit or system. Thus, the conduit systems described and/or shown herein are merely for illustrative purposes and are not meant to limit the present teachings in any way. Moreover, where two or more conduits may be described as connected to, coupled to, or otherwise joining a component or components, for example, a valve assembly and a source of gaseous reformable fuel, a single conduit also can be envisioned as achieving the same design and/or purpose, where the component such as a valve assembly can be described as being "in-line with," "situated within," or "associated with" a single conduit. In addition, "coupled to," "connected to" or otherwise joining two or more components or structure can mean that the one component or structure is directly or indirectly coupled, connected or joined to another component or structure.

A conduit can be a duct, for example, a channel, tube or passageway for conveying a fluid. For example, a source of positive gaseous pressure conduit can be used to carry or deliver a gas, for example, from a source of positive gas pressure such as a blower, pump or compressor to a gaseous headspace of a liquid reformable fuel reservoir. As another example, a liquid reformable fuel conduit can be used to carry or deliver liquid reformable fuel from a liquid reformable fuel reservoir to a vaporizer or a valve assembly upstream from the vaporizer. A conduit can be a manifold, for example, a chamber, pipe or duct with a number of inlets or outlets used to collect or distribute a fluid. As used herein, a "common conduit" generally refers to a multi-ported conduit for fluid delivery to and/or from specific locations.

A multi-reformable fuel delivery system and/or a fuel cell unit and/or system can include a control system for automating the operations of the delivery system and/or the fuel cell unit and/or system. The control system can include a plurality of sensors in communication with a controller. In response to input signals from the sensors, user commands from a user-input device and/or programmed subroutines and command sequences, a controller can manage the operations of a delivery system and/or a fuel cell unit or system.

A delivery system, a fuel cell unit and a fuel cell system of the present teachings can include a control system for independently automating the operations of one or more of the delivery system, components thereof, the individual fuel cell units, components thereof, and the fuel cell system including components thereof, for example, in its start-up, steady-state, and/or shut-down modes. A control system can include control components, for example, control electronics, actuators, valve assemblies, sensor assemblies, and other structure and devices to monitor, control and/or adjust independently the operation of one or more of a delivery system, individual components thereof such as a valve assembly, sources of positive gas pressure and gaseous reformable fuel, an individual fuel cell unit, one or more components thereof, and a fuel cell unit or system.

A control system can include a controller, which can be in communication with the various control components and components of a delivery system and/or each fuel cell unit. The control system and/or controller can monitor and logically control the flow path of fluids through individual components of a delivery system, through individual fuel cell units, and through a fuel cell system. In other words, a custom fluid circuit can be achieved in a delivery system, in a fuel cell unit and/or in a fuel cell system using a control system.

The control system can include one or more sensors or sensor assemblies in communication with a controller. In response to input signals from the sensors, user commands from a user-input device and/or programmed subroutines and command sequences, a controller can independently manage the operations of a delivery system and/or one or more fuel cell units. The controller can be software operating on a processor. However, it is within the scope of the present teachings to employ a controller that is implemented with one or more digital or analog circuits, or combinations thereof. In response to input signals from the sensors, user commands from a user-input device and/or programmed subroutines and command sequences, a controller can manage the operations of a delivery system and/or of one or more fuel cell units, and/or of a fuel cell system.

The sensor assemblies can, but do not necessarily, include a transducer in communication with the controller. The communication pathways will ordinarily be wired electrical signals but any other suitable form of communication pathway can also be employed. That is, the sensor assemblies, control signal-receiving devices, and communication pathways herein can be of any suitable construction. A wireless communication pathway can be used, such as a Bluetooth connection. The wireless communication pathway(s) can be part of a wireless network that uses wireless data connections for connecting network nodes. A combination of wired and wireless communication pathways can be used.

In one aspect, the present teachings provide a liquid and gaseous reformable fuel delivery system for a fuel cell unit and/or system. The delivery systems generally includes a liquid reformable fuel reservoir, where the interior of the liquid reformable fuel reservoir includes a liquid reformable fuel space and a gaseous headspace and the liquid reformable fuel space is in operable fluid communication with a vaporizer and/or a fluid mixing device of a fuel cell unit; and a source of a gaseous reformable fuel, where the source of a gaseous reformable fuel is in operable fluid communication with the gaseous headspace of the liquid reformable fuel reservoir, and in operable fluid communication with at least one of a vaporizer, a reformer, a fuel cell stack, and an afterburner of a fuel cell unit.

In various embodiments, the delivery system can include a liquid reformable fuel reservoir, wherein the interior of the liquid reformable fuel reservoir includes a liquid reformable fuel space and a gaseous headspace; a source of a gaseous reformable fuel, where the source of a gaseous reformable fuel is in operable fluid communication with at least one of a vaporizer, a reformer, a fuel cell stack and an afterburner of a fuel cell unit, and in operable fluid communication with the gaseous headspace of the liquid reformable fuel reservoir; and a vaporizer, where the vaporizer is in operable fluid communication with the liquid reformable fuel space of the liquid reformable fuel reservoir and in operable fluid communication with at least one of a reformer, a fluid mixing device, and a fuel cell stack, for example, in operable fluid communication can be with at least one of an inlet of a reformer, an inlet of a fluid mixing device, and an inlet of a fuel cell stack.

The delivery system generally does not include a liquid pump for delivering gaseous reformable fuel to at least one of a vaporizer, a reformer, a fluid mixing device, a fuel cell stack and an afterburner, and for delivering liquid reformable fuel to the vaporizer and/or a fluid mixing device. In some embodiments, the liquid reformable fuel space is defined by the interior of a bladder, where the interior of the bladder can be in fluid communication with the vaporizer.

In various embodiments, the liquid and gaseous reformable fuel delivery system can include a source of positive gas pressure different from the source of gaseous reformable fuel, where the source of positive gas pressure is in operable fluid communication with the gaseous headspace of the liquid reformable fuel reservoir. That is, rather than or in addition to the source of positive gaseous pressure providing or delivering gas or gas pressure to the gaseous headspace of the liquid reformable fuel reservoir, the source of positive gas pressure can provide or deliver gas or gas pressure to the gaseous headspace to pressurize the gaseous headspace and displace liquid reformable fuel from the liquid reformable fuel space and/or deliver gas from the gaseous headspace (e.g., through a pressure relief valve assembly) to at least one of a vaporizer, a reformer, a fuel cell stack, and an afterburner.

In some embodiments, the delivery systems can include a first valve assembly operable to provide fluid communication between the source of a gaseous reformable fuel and at least one of a vaporizer, a reformer, a fuel cell stack, and an afterburner, and between the source of gaseous reformable fuel and the gaseous headspace of the liquid reformable fuel reservoir. The delivery systems can include a second valve assembly operable to provide fluid communication between the liquid reformable fuel space and a vaporizer and/or a fluid mixing device. The first valve assembly also can be operable to provide fluid communication between the gaseous headspace of the liquid reformable fuel reservoir and at least one of a vaporizer, a reformer, a fuel cell stack, and an afterburner of a fuel cell unit.

The first and second valve assemblies can be of different configurations and include different components depending on the application and desired control of delivery of gaseous reformable fuel. For example, the first valve assembly can include one or more proportional valves, which can be upstream or downstream from a metering valve sub-assembly along with an orifice and/or a series of orifices and associated proportional valves defining a piccolo arrangement of the orifices/valves for proportional rather than digital control of fluid flow. The second valve assembly can include one or more proportional valves, shut-off valves and check valves, as well as one or more orifices. An orifice can be between two pressure sensors, for example, two pressure taps, for measuring the fluid flow differential pressure through the orifice (or other valve or valve assembly).

The delivery systems of the present teachings can include a pressure relief valve assembly, which is in operable fluid communication with the gaseous headspace of the liquid reformable fuel reservoir. The pressure relief valve assembly can assist in the control of the gas pressure in the gaseous headspace to provide the appropriate balance of gas pressure in the system to delivery as needed the various liquid and gaseous reactants for reforming. In particular embodiments, the gaseous headspace is in operable fluid communication with at least one of the vaporizer, the reformer, the fuel cell stack, and the afterburner via the pressure relief valve assembly. In such cases, the gas and its constituents such as one or more of a gaseous reformable fuel, the vapor of the liquid reformable fuel in the gaseous headspace, and an oxygen-containing gas can be delivered to where the energy-containing constituents can be used to generate electricity and/or heat as needed, and/or to supplement the oxygen-containing gas for an appropriate ratio of oxygen to fuel for the energy-efficient operation of the fuel cell unit and/or system.

In certain embodiments, the delivery systems can include a third valve assembly operable to provide fluid communication between the source of gaseous reformable fuel and the gaseous headspace of the liquid reformable fuel reservoir. In such an arrangement, the first valve assembly can be operable to provide fluid communication between or among the source of gaseous reformable fuel and at least one of the vaporizer, the reformer, the fuel cell stack, and the afterburner. The first and third valve assemblies can be operable to provide fluid communication between the gaseous headspace and one or more of the vaporizer, the reformer, and the afterburner of a fuel cell unit.

The third valve assembly can be of different configurations and include different components depending on the application and desired control of delivery of gaseous reformable fuel. For example, the third valve assembly can include one or more three-way valves for delivering gaseous reformable fuel and/or gas from the gaseous headspace of the liquid reformable fuel reservoir to the various downstream components such as a vaporizer, a reformer (e.g., by-passing the vaporizer), a fuel cell stack (e.g., by-passing the vaporizer and the reformer) and/or an afterburner (e.g., by-passing the vaporizer, the reformer and the fuel cell stack).

It should be understood that the third valve assembly may not be needed in various designs and configurations of the delivery systems of the present teachings as the functions of the third valve assembly can be carried out by the first valve assembly. In addition, in certain designs and configurations, depending on the individual components and their function, a pressure relief valve assembly may not be required for the delivery system. However, the use of a pressure relief valve assembly can provide direct control and monitoring of the gas pressure in the gaseous headspace to permit more efficient operation of the delivery system. Nevertheless, it should be understood that the concepts of the present teachings can be carried out using many different configurations and arrangements of delivery system components, conduits, valve assemblies, sensor assemblies, and other components of a fuel cell unit and/or system that are too numerous to be described and/or depicted herein. Nonetheless, the present teachings include such different configurations and arrangements.

Regardless of the control mechanisms and features of the source of positive gas pressure, the source of positive gas pressure can control fluid flow and delivery of liquid reformable fuel through the delivery system. That is, the source of positive gas pressure can be used to displace liquid reformable fuel from the liquid reformable fuel reservoir to a vaporizer by increasing the pressure in the gaseous headspace (increased pressure compared to the pressure outside the liquid reformable fuel reservoir). When the pressure in the gaseous headspace is or becomes sufficient to displace the liquid reformable fuel from the source of liquid reformable fuel, adjustment of the system components and controls, for example, valve assemblies, can permit the liquid reformable fuel to flow and be delivered from the liquid reformable fuel reservoir, for example, to a vaporizer. Of course, the system components and controls can be adjusted prior to or simultaneously with the pressurization of the gaseous headspace as well as after pressurization.

In such a case where a source of positive gas pressure is used to displace the liquid reformable fuel from the liquid reformable fuel reservoir, the gaseous reformable fuel from the source of gaseous reformable fuel often is not directed into the gaseous headspace as such gas is unnecessary to create a positive pressure in the gaseous headspace and/or the use of gaseous reformable fuel is undesired. However, the positive pressure in the gaseous headspace can be used to deliver the gas, which can include gaseous (e.g., vaporized) liquid reformable fuel, present in the gaseous headspace to a vaporizer, a reformer and/or an afterburner. Such a configuration and flow pattern also can mix an oxygen-containing gas, for example, air, from the source of positive gas pressure, with the gaseous reformable fuel and/or the gaseous liquid reformable fuel to create a gaseous reforming reaction mixture such as a gaseous CPOX reforming reaction mixture, which then can be delivered to a reformer for the reforming reaction.

Indeed in various embodiments of the delivery systems and methods of the present teachings, not only is the gaseous reformable fuel not directed into the gaseous headspace, the source of gaseous reformable fuel is not in operable fluid communication with the gaseous headspace of the liquid reformable fuel reservoir, for example, valve assemblies and conduits between the two components are not present to couple them. Accordingly, a liquid and gaseous reformable fuel delivery system for a fuel cell unit or system can include a liquid reformable fuel reservoir, where the interior of the liquid reformable fuel reservoir includes a liquid reformable fuel space and a gaseous headspace and the liquid reformable fuel space is in operable fluid communication with a vaporizer and/or a fluid mixing device of a fuel cell unit; a source of positive gas pressure, where the source of positive gas pressure is in operable fluid communication with the gaseous headspace of the liquid reformable fuel reservoir; and a source of a gaseous reformable fuel, where the source of a gaseous reformable fuel is in operable fluid communication with at least one of a vaporizer, a reformer, a fuel cell stack, and an afterburner of a fuel cell unit.

In such embodiments, the liquid and gaseous reformable fuel delivery system can include a pressure relief valve assembly in operable fluid communication with the gaseous headspace of the liquid reformable fuel reservoir. The delivery systems can include a first valve assembly operable to provide fluid communication between or among the source of a gaseous reformable fuel and at least one of a vaporizer, a reformer, a fuel cell stack, and an afterburner. The delivery systems can include a second valve assembly operable to provide fluid communication between the liquid reformable fuel space and a vaporizer and/or a fluid mixing device.

As mentioned herein, the delivery systems of the present teachings can include fluid communication between or among the gaseous headspace of the liquid reformable fuel reservoir and one or more of a vaporizer, a reformer, a fuel cell stack, and an afterburner. The gas in the gaseous headspace can be directed or delivered to one or more components of the fuel cell unit including a vaporizer, a fluid mixing device, a reformer, a fuel cell stack, and an afterburner. The gas from the gaseous headspace can be directed to those fuel cell unit components via the first valve assembly and its conduit system or the first and third valve assemblies and their conduit systems. The gas from the gaseous headspace can be delivered to at least one of a vaporizer, a fluid mixing device, a reformer, a fuel cell stack, and an afterburner through a pressure relief valve assembly in operable fluid communication with the gaseous headspace and those components of a fuel cell unit or system. That is, the gaseous headspace of the liquid reformable fuel reservoir can be in operable fluid communication with at least one of a vaporizer, a reformer, a fuel cell stack, and an afterburner via a pressure relief valve assembly. The gas from the gaseous headspace can be directed to such fuel cell components using a dedicated conduit or conduit system for such gas, where the dedicated conduit(s) can have the appropriate valve assemblies, sensor assemblies and other components necessary to monitor and control the delivery of the gas as appropriate for the application.

Consequently, the appropriate adjustment of the first and second valve assemblies (and third valve assembly, if present) along with the control of the source of positive gas pressure (e.g., by adjusting a pressure relief valve assembly associated with the liquid reformable fuel reservoir) can flow and deliver only gaseous reformable fuel to at least one of the vaporizer, the reformer and the afterburner; can flow and deliver only liquid reformable fuel to the vaporizer; or can flow and deliver both gaseous reformable fuel and/or gaseous liquid reformable fuel to at least one of the vaporizer, the reformer and the afterburner, and liquid reformable fuel to the vaporizer. The proportions and amounts, as well as the site of delivery, of the reformable fuels can be controlled by adjusting the valve assemblies and other fluid flow or delivery controls present in the delivery system.

In particular embodiments, the liquid and gaseous reformable fuel delivery system can include a fourth valve assembly operable to provide fluid communication between the vaporizer and the reformer. Each of the first valve assembly, the second valve assembly, and when present, the third valve assembly, the fourth valve assembly and any higher order valve assembly, can include at least one of a proportional valve, an on/off valve, a three-way valve, a check valve, and an orifice.

A source of oxygen-containing gas can be associated with and/or included in the delivery systems and methods of the present teachings such as a source of positive gas pressure, as well as in a fuel cell unit or system that uses a delivery system and/or a method of the present teachings. A source of oxygen-containing gas can be used in operable fluid communication with the gaseous headspace of a liquid reformable fuel reservoir. A source of oxygen-containing gas can be in operable fluid communication with at least one of a vaporizer, a fluid mixing device, a reformer, a fuel cell stack and an afterburner. In particular embodiments, the delivery systems can include or be associated with a source of oxygen-containing gas, for example, a pump, blower or compressor.

As discussed herein, a fluid mixing device can be associated with and/or included in the delivery systems and methods of the present teachings. One or more inlets of the fluid mixing device can be in operable fluid communication with at least one of a source of liquid reformable fuel, a liquid reformable fuel space, an outlet of the vaporizer, a source of gaseous reformable fuel, and a source of oxygen-containing gas. An outlet of the fluid mixing device can be in operable fluid communication with the reformer and/or the fuel cell stack. A fluid mixing device can mix a reformable fuel with an oxygen-containing gas and/or steam to provide a gaseous reforming reaction mixture suitable for reforming with a reformer and/or a fuel cell stack of a fuel cell unit or system. Homogeneous mixing of reactants can be more important for "on-cell" reforming whereby the reforming catalyst is incorporated into the fuel electrodes of a fuel cell stack. A fluid mixing device that can provide a substantially uniformly mixed or homogeneous gaseous reforming reaction mixture can increase the efficient operation of a fuel cell unit or system.

Another feature of the present teachings not used directly in the delivery of gaseous and liquid reformable fuels is a primary source of liquid reformable fuel. The primary source of liquid reformable fuel can be used to refill a liquid reformable fuel reservoir. Accordingly, the primary source of liquid reformable fuel can be in fluid communication with the liquid reformable fuel space of the liquid reformable fuel reservoir, where the fluid communication can be temporary, for example, during a refilling process.

In certain embodiments, a pump, such as a liquid or fuel pump, can be used to deliver liquid reformable fuel from the primary source of liquid reformable fuel to the liquid reformable fuel space. Examples of a pump such as a liquid or fuel pump include a metering pump, a rotary pump, an impeller pump, a diaphragm pump, a peristaltic pump, a positive displacement pump, a gear pump, a piezoelectric pump, an electrokinetic pump, an electroosmotic pump, and a capillary pump.

The present teachings also include a fuel cell unit or system including a liquid and gaseous reformable fuel delivery system as described herein. The fuel cell system can include a fuel cell stack in operable fluid communication with a reformer; and an afterburner in operable fluid communication with an exhaust outlet of the fuel cell stack. A fuel cell unit or system can include a vaporizer, where the vaporizer is in operable fluid communication with a reformer and/or a fuel cell stack. Known and conventional fuel cells come in a variety of types and configurations including phosphoric acid fuel cells (PAFCs), alkaline fuel cells (AFCs), polymer electrolyte membrane (or proton exchange membrane) fuel cells (PEMFCs), and solid oxide fuel cells (SOFCs).

In another aspect, the present teachings provide methods of operating a liquid and gaseous reformable fuel delivery system as well as methods of controlling the flow and delivery of gaseous and liquid reformable fuels to at least one or a vaporizer, a reformer, a fuel cell stack, and an afterburner of a fuel cell unit or system. Such methods can control the flow and delivery of gaseous and liquid reformable fuels to at least one of a vaporizer, a reformer, a fuel cell stack, and an afterburner without the use of a liquid pump.

The methods of operating a delivery system of the present teachings generally include adjusting the gas pressure of the gaseous headspace of the liquid reformable fuel reservoir and from the source of gaseous reformable fuel, to control the delivery of gaseous reformable fuel from the source of gaseous reformable fuel to one or more of a fluid mixing device, a reformer, a fuel cell stack and an afterburner, and the delivery of liquid reformable fuel from the liquid reformable fuel reservoir to a vaporizer and/or a fluid mixing device.

In various embodiments, the methods can include adjusting the gas pressure among a source of gaseous reformable fuel, a gaseous headspace of the liquid reformable fuel reservoir, and one or more of a vaporizer, a reformer, a fuel cell stack, and an afterburner, to control the delivery of gaseous reformable fuel from the source of gaseous reformable fuel to the gaseous headspace of the liquid reformable fuel reservoir and to one or more of the reformer, the fuel cell stack and the afterburner, and the delivery of liquid reformable fuel from the liquid reformable fuel reservoir to a vaporizer and/or a fluid mixing device. Methods of operating a delivery system can include adjusting the gas pressure or gas delivery from a source of oxygen-containing gas and/or a source of steam, which gaseous reactants can be mixed with a reformable fuel for reforming.

In certain embodiments, the methods of operating a delivery system of the present teachings can include adjusting the gas pressure of the gaseous headspace of the liquid reformable fuel reservoir and from a source of gaseous reformable fuel and a source of positive gas pressure, to control the delivery of gaseous reformable fuel from the source of gaseous reformable fuel to the gaseous headspace of the liquid reformable fuel reservoir and to one or more of a vaporizer, a fluid mixing device, a reformer, a fuel cell stack and an afterburner, and the delivery of liquid reformable fuel from the liquid reformable fuel reservoir to a vaporizer and/or a fluid mixing device.

In particular embodiments, the methods of operating a delivery system of the present teachings can include adjusting the gas pressure among the source of gaseous reformable fuel, the source of positive gas pressure, the gaseous headspace of the liquid reformable fuel reservoir, and one or more of a vaporizer, a fluid mixing device, a reformer, a fuel cell stack and an afterburner, to control the delivery of gaseous reformable fuel from the source of gaseous reformable fuel to the gaseous headspace of the liquid reformable fuel reservoir and to one or more of a vaporizer, a fluid mixing device, a reformer, a fuel cell stack and an afterburner, and the delivery of liquid reformable fuel from the liquid reformable fuel reservoir to a vaporizer and/or a fluid mixing device.

The characteristics of fluid flow through the delivery system such as flow rate, pressure and other properties of a flowing fluid (e.g., a gaseous reformable fuel) can be controlled by appropriately adjusting the components of the delivery system, for example, the valve assemblies and sources of positive gas pressure and gaseous reformable fuel.

Accordingly, in some embodiments, the methods of operating a liquid and gaseous reformable fuel delivery system of the present teachings can include adjusting a pressure relief valve assembly, a first valve assembly, a second valve assembly, and a third valve assembly, when present, to control the delivery of gaseous reformable fuel from the source of gaseous reformable fuel to the gaseous headspace of the liquid reformable fuel reservoir and to at least one of a fluid mixing device, a reformer, a fuel cell stack and an afterburner, and the delivery of liquid reformable fuel from the liquid reformable fuel reservoir to a vaporizer and/or a fluid mixing device. As described herein, in certain embodiments, the functions of the third valve assembly can be carried out by the first valve assembly such that only two valve assemblies, i.e., the first valve assembly and the second valve assembly, may be required in the practice of the methods of the present teachings.

More specifically, in a start-up mode of operation of a fuel cell system, the use of only gaseous reformable fuel may be desired until the fuel cell system warms up and the heat generated by the fuel cell system can be used to assist in vaporizing liquid reformable fuel thereby to reduce the load on the balance of plant during start-up. In such a case, where reforming only gaseous reformable fuel initially is desired, the valve assemblies can be adjusted such that a gaseous reformable fuel from the source of gaseous reformable fuel can flow or be delivered to at least one of a reformer, a fuel cell stack and an afterburner. Accordingly, in some embodiments of the methods of operating a delivery system, adjusting the pressure relief valve assembly, the first valve assembly, the second valve assembly and the third valve assembly, when present, and the source of positive gas pressure, can include directing or delivering gaseous reformable fuel, for example, through a first valve assembly, to at least one of a reformer, a fuel cell stack and an afterburner; and preventing or minimizing the delivery of liquid reformable fuel to a vaporizer and/or a fluid mixing device.

In certain embodiments, in a start-up mode of operation, the gaseous reformable fuel can be delivered directly to an afterburner of a fuel cell system. Starting an afterburner and its combustion reactions can be more difficult than for other fuel cell unit or system components. In addition, an afterburner should be operational from the beginning of the reforming and electro-chemical conversion processes. Accordingly, delivering only gaseous reformable fuel initially to a reformer can more efficiently ignite the afterburner. Such methods can include directing or delivering gaseous reformable fuel from the reformer to a fuel cell stack and through the fuel cell stack to an afterburner to initiate combustion in the afterburner. Gaseous reformable fuel can be delivered directly to the afterburner, for example, by-passing the reformer and fuel cell stack. Subsequently, after the afterburner is operational, the heat of exotherm from the combustion reactions of the afterburner can be used to heat the other components of the fuel cell system. For example, heat from the afterburner can be directed to a vaporizer and/or to a stream of liquid reformable fuel before the vaporizer so that the liquid reformable fuel can be heated and converted to gaseous liquid reformable fuel for reforming. Heat from the afterburner also can be used to heat the fuel cell stack.

Accordingly, in certain embodiments, for example, in a start-up mode of a fuel cell system, adjusting the pressure relief valve assembly, the first valve assembly, the second valve assembly, and the third valve assembly, when present, can include directing or delivering gaseous reformable fuel through the first valve assembly to at least one of a vaporizer, a fluid mixing device, a reformer, a fuel cell stack and an afterburner. In particular embodiments, the methods can include directing or delivering gaseous reformable fuel through the first valve assembly to a reformer, from the reformer to a fuel cell stack, and through the fuel cell stack to an afterburner to initiate combustion in the afterburner. Gaseous reformable fuel can be delivered directly to the afterburner, for example, by-passing the reformer and fuel cell stack. The methods can include minimizing or preventing the delivery of liquid reformable fuel to a vaporizer and a fluid mixing device.

After the fuel cell system and in particular, the vaporizer, are within their operational temperature ranges, the use of only gaseous reformable fuel can be curtailed, with liquid reformable fuel then becoming the primary fuel consumed by the fuel cell system. In such a case, the amounts of gaseous reformable fuel and liquid reformable fuel delivered by the delivery system can be controlled and apportioned appropriately, for example, by adjusting components of the delivery system such as the valve assemblies and the gas pressure from the sources of positive gas pressure and gaseous reformable fuel.

In the transition from only gaseous reformable fuel to liquid reformable fuel or in applications where the use of both gaseous and liquid reformable fuels is desired, each of the pressure relief valve assembly, the first valve assembly, the second valve assembly, and the third valve assembly, when present, can be adjusted appropriately to deliver the gaseous reformable fuel through the first valve assembly and to least one of a vaporizer, a reformer, a fuel cell stack and an afterburner, and to deliver liquid reformable fuel through the second valve assembly to a vaporizer and/or a fluid mixing device. In such a case, the proportions of gaseous and liquid reformable fuels delivered to the vaporizer and/or the reformer can be controlled by adjusting the gas pressure in the delivery system such that the desired proportions of gaseous and liquid reformable fuels can be delivered to these components of the fuel cell system.

After the fuel cell system is in its steady-state mode, use of only liquid reformable fuel to generate electricity may be desired. For example, a pressure relief valve assembly, a first valve assembly, a second valve assembly, and a third valve assembly, when present, can be adjusted so that gaseous reformable fuel flows or is delivered through the first valve assembly and/or the third valve assembly, if present, into the gaseous headspace of the liquid reformable fuel reservoir thereby increasing the pressure in the gaseous headspace. When a source of positive gas pressure is present and used, the positive gas pressure from the source of positive gas pressure can be adjusted to increase sufficiently the gas pressure within the gaseous headspace. With the appropriate adjustment of the second valve assembly, the pressurized gaseous headspace can displace the liquid reformable fuel present in the liquid reformable fuel reservoir through an outlet of the liquid reformable fuel reservoir to the second valve assembly and to a vaporizer. Where only or substantially only liquid reformable fuel is delivered, the methods can include minimizing or preventing the delivery of gaseous reformable fuel to a vaporizer, a fluid mixing device, a reformer, a fuel cell stack and an afterburner, for example, through the first valve assembly (e.g., when a third valve assembly is present).

Accordingly, in particular embodiments, in steady-state mode of a fuel cell system, adjusting the pressure relief valve assembly, the first valve assembly, the second valve assembly, and the third valve assembly, when present, can include directing or delivering gas from the source of positive gas pressure into the gaseous headspace to displace liquid reformable fuel from the liquid reformable fuel reservoir through the second valve assembly and to a vaporizer and/or a fluid mixing device. The methods can include minimizing or preventing the delivery of gaseous reformable fuel through the first valve assembly. The methods can include directing or delivering gas, which can include at least one of vapor of a liquid reformable fuel, a gaseous liquid reformable fuel and an oxygen-containing gas, from the gaseous headspace through the third valve assembly and the first valve assembly to at least one of a vaporizer, a fluid mixing device, a reformer, a fuel cell stack and an afterburner.

In some embodiments, methods of operating the liquid and gaseous reformable fuel delivery systems of the present teachings can include adjusting the pressure relief valve assembly, the first valve assembly, the second valve assembly, and the third valve assembly, when present, to control the delivery of gaseous reformable fuel from the source of gaseous reformable fuel to the gaseous headspace of the liquid reformable fuel reservoir and to at least one of a fluid mixing device, a reformer, a fuel cell stack and an afterburner, and the delivery of liquid reformable fuel from the liquid reformable fuel reservoir to a vaporizer.

In various embodiments, the methods generally include delivering gas from the gaseous headspace of the liquid reformable fuel reservoir to at least one of a vaporizer, a fluid mixing device, a reformer, a fuel cell stack and an afterburner. The delivery of the gas from the gaseous headspace can be through the first valve assembly and the third valve assembly, when present, and/or through a dedicated conduit system that provides operable fluid communication between or among the gaseous headspace of the liquid reformable fuel reservoir and one or more components of a fuel cell unit or system such as a vaporizer, a fluid mixing device, a reformer, a fuel cell stack and an afterburner. In the latter case, a pressure relief valve assembly can be operable to provide fluid communication between or among the gaseous headspace of the liquid reformable fuel reservoir and one or more of a vaporizer, a fluid mixing device, a reformer, a fuel cell stack and an afterburner.

Methods of controlling the flow and delivery of gaseous and liquid reformable fuels to a reformer coupled to a fuel cell system without the use of a liquid pump can be described independent of the specific structure and components of the delivery systems described herein. Such methods generally can include delivering gaseous reformable fuel to at least one of a vaporizer, a fluid mixing device, a reformer, a fuel cell stack, and an afterburner. The methods can include applying gas pressure to a gaseous headspace of a liquid reformable fuel reservoir to: (a) deliver liquid reformable fuel to a vaporizer and/or a fluid mixing device; (b) deliver gas from the gaseous headspace to at least one of a vaporizer, a fluid mixing device, a reformer, a fuel cell stack and an afterburner; or (c) deliver liquid reformable fuel to a vaporizer and deliver gas from the gaseous headspace to at least one of a vaporizer, a reformer, a fuel cell stack and an afterburner. Such methods can include directing or delivering the vaporized liquid reformable fuel, if present, to the reformer and/or the fuel cell stack. The liquid reformable fuel can be delivered without passing through conduits for gaseous reformable fuel. In such methods, the vaporized liquid reformable fuel can mix with the gaseous reformable fuel prior to introduction to the reformer, for example, in a fluid mixing device.

Other methods of controlling the delivery of gaseous and liquid reformable fuels to a reformer of a fuel cell system without the use of a liquid pump and independent of the specific structure and components of a delivery system of the present teachings generally can include using (a first) positive gas pressure to displace and deliver liquid reformable fuel to a fluid mixing device and/or a vaporizer, for example, to create a vaporized liquid reformable fuel. The methods can include using (a second) positive gas pressure to deliver a gaseous reformable fuel to at least one of a vaporizer, a fluid mixing device, a reformer, a fuel cell stack, a stream of vaporized liquid reformable fuel, and an afterburner.

In various embodiments, the methods can include using the (first) positive gas pressure to displace a gas, which can include one or more of vapor of a liquid reformable fuel, a gaseous liquid reformable fuel and an oxygen-containing gas, from a gaseous headspace of a reservoir of liquid reformable fuel and deliver the gas to at least one of a vaporizer, a fluid mixing device, a reformer, a fuel cell stack and the afterburner. In particular embodiments, the first positive gas pressure and the second positive gas pressure are the same.

In certain embodiments, the liquid reformable fuel does not pass through conduits for gaseous reformable fuel.

In methods of the present teachings, delivering or delivery of liquid reformable fuel can include delivering or delivery of a liquid reformable fuel to a vaporizer and/or a fluid mixing device. One or more inlets of the fluid mixing device can be in operable fluid communication with the liquid reformable fuel space and in operable fluid communication with a source of oxygen-containing gas. An outlet of the fluid mixing device can be in operable fluid communication with a reformer and/or a fuel cell stack.

In various embodiments of the methods, delivering or delivery of liquid reformable fuel can include delivering or delivery of an oxygen-containing gas and a vaporized liquid reformable fuel and/or a gaseous reformable fuel to a fluid mixing device. One or more inlets of the fluid mixing device can be in operable fluid communication with an outlet of a vaporizer and/or a source of gaseous reformable fuel and in operable fluid communication with a source of oxygen-containing gas. An outlet of the fluid mixing device can be in operable fluid communication with a reformer and/or a fuel cell stack.

In some embodiments, the methods include delivering an oxygen-containing gas to at least one of a stream of liquid reformable fuel, a vaporizer, a stream of vaporized liquid reformable fuel, a stream of gaseous reformable fuel, a fluid mixing device, a reformer, a fuel cell stack, and an afterburner.

In certain embodiments, adjusting the gas pressure or adjusting the valve assemblies can control the delivery of gas from the gaseous headspace of the liquid reformable fuel reservoir to at least one of a vaporizer, a fluid mixing device, a reformer, a fuel cell stack, and an afterburner. The methods can include delivering gas from the gaseous headspace of the liquid reformable fuel reservoir to at least one of a vaporizer, a fluid mixing device, a reformer, a fuel cell stack, and a afterburner.

The methods of the present teachings can include delivering a mixture of a reformable fuel and an oxygen-containing gas to at least one of a fluid mixing device, a reformer and a fuel cell stack.

The following exemplary embodiments are provided to illustrate further and to facilitate the understanding of the present teachings and are not in any way intended to limit the invention.

Again, as stated previously for brevity, the discussion and description herein will focus on partial oxidation reforming reactions and reactants including catalytic partial oxidation reforming reactions and reactants (a reformable fuel and an oxygen-containing gas). However, the devices, assemblies, systems and methods described herein can equally apply to other reforming reactions such as steam reforming and autothermal reforming and their respective reactants. For example, for steam reforming, steam can replace an oxygen-containing gas in the description herein. For autothermal reforming, steam can be introduced along with an oxygen-containing gas and/or a reformable fuel in the description herein.

FIG. 1A is a schematic diagram of an embodiment of a liquid and gaseous reformable fuel delivery system of the present teachings where a source of gaseous reformable fuel is used to flow and deliver gaseous reformable fuel and liquid reformable fuel through the delivery system.

Referring to FIG. 1A, the liquid and gaseous reformable fuel delivery system 10 includes a liquid reformable fuel reservoir 12, where the interior of the liquid reformable fuel reservoir includes a liquid reformable fuel space 14 and a gaseous headspace 16. The liquid reformable fuel space can include a liquid reformable fuel. The liquid reformable fuel reservoir 12 includes a pressure sensor assembly 6 and a pressure relief valve assembly 8. The liquid and gaseous reformable fuel delivery system 10 also includes a source of gaseous reformable fuel 18, such as a canister or tank of propane, butane, natural gas, or other gaseous reformable fuel.

Still referring to FIG. 1A, the depicted liquid and gaseous reformable fuel delivery system 10 includes a first valve assembly 20 and a second valve assembly 22. The first valve assembly 20 is operable to provide fluid communication between the source of gaseous reformable fuel 18 and a reformer 26, between the source of gaseous reformable fuel 18 and a vaporizer 28, and between the source of gaseous reformable fuel 18 and the gaseous headspace 16 of the liquid reformable fuel reservoir 12. The second valve assembly 22 is operable to provide fluid communication between the liquid reformable fuel space 14 and the vaporizer 28. Although gaseous communication can be established between the vaporizer and the liquid reformable fuel space when empty, the second valve assembly is operable to provide fluid communication, for example, liquid communication, between the vaporizer and the liquid reformable fuel space containing a liquid reformable fuel.

The delivery system 10 in FIG. 1A also includes a controller 11 to control and automate the operations of the delivery system and fuel cell unit components. As shown, the controller 11 is independently connected to the pressure sensor assembly 6, the pressure relief valve assembly 8, the first valve assembly 20, the second valve assembly 22, the vaporizer 28, and the reformer 26.

As described herein, the controller can have communication pathways with each of the valve assemblies, sensor assemblies, and other components and/or structure that are desirable to monitor and/or control during the operation of the fluid delivery system. For example, the controller can monitor and logically control the flow paths of the fluids in the delivery system through the first and second valve assemblies using the pressure relief valve. The pressure sensor assembly can communicate with the controller regarding the pressure in the gaseous headspace so that the controller can initiate adjustments to the valve assemblies and/or other components, as appropriate. The communication pathways can be wired and/or wireless.

In operation, the first and second valve assemblies and the pressure relief valve assembly can be adjusted to provide fluid flow through the system as needed for a particular application. For example, in a start-up mode of operation of a fuel cell system where initially reforming only gaseous reformable fuel can be desired, the first valve assembly can be adjusted and the second valve assembly can be closed such that the gaseous reformable fuel from the source of gaseous reformable fuel can flow or be delivered only through the first valve assembly directly to the reformer and/or to the vaporizer (or to other components of a fuel cell unit or system not shown, for example, an afterburner). The characteristics of fluid flow through the delivery system such as flow rate, pressure and other properties of a flowing fluid (e.g., a gaseous reformable fuel) can be controlled by appropriately adjusting the components of the delivery system, for example, in this exemplary depiction, the pressure relief valve assembly, the first valve assembly, and the second valve assembly.

Alternatively, if the use of only liquid reformable fuel is desired, the first and second valve assemblies can be adjusted so that gaseous reformable fuel flows or is delivered through the first valve assembly only into the gaseous headspace of the liquid reformable fuel reservoir thereby increasing the pressure in the gaseous headspace. With the appropriate adjustment of the second valve assembly, the pressurized gaseous headspace can displace the liquid reformable fuel present in the liquid reformable fuel reservoir through the second valve assembly to the vaporizer.

The pressure relief valve assembly, which is in operable fluid communication with the gaseous headspace of the liquid reformable fuel reservoir, can be adjusted to bleed off gas to maintain or lower the pressure in the gaseous headspace, as needed, to provide a steady flow and delivery of liquid reformable fuel to the second valve assembly and vaporizer. In certain embodiments, the pressure relief valve assembly also can be in operable fluid communication with at least one of a vaporizer, a reformer, a fuel cell stack, and an afterburner. In such a configuration, the gas and its constituents such as reforming reactants (e.g., vapor of the liquid reformable fuel, a gaseous reformable fuel, and an oxygen-containing gas) can be delivered to one or more of a vaporizer, a reformer, a fuel cell stack and an afterburner to be reacted, consumed or otherwise processed or transferred thereby providing a more energy efficient process. The composition of the gas delivered from the gaseous headspace can be substantially or primarily an oxygen-containing gas (e.g., dominated by an oxygen-containing gas from a source of positive gas pressure) such that the delivery of the gas from the gaseous headspace through the pressure relief valve can supplement the oxygen to fuel ratio for a gaseous reforming reaction mixture.

In applications where the use of both gaseous and liquid reformable fuels is desired, each of the first and second valve assemblies, as well as the pressure relief valve assembly, can be adjusted appropriately to deliver the gaseous reformable fuel through the first valve assembly to the gaseous headspace and to the vaporizer and/or reformer, and to deliver liquid reformable fuel through the second valve assembly to the vaporizer. In such a case, the proportions of gaseous and liquid reformable fuels delivered to the vaporizer and/or reformer can be controlled by manipulating or adjusting the pressure of the delivery system such that the desired proportions of gaseous and liquid reformable fuels can be delivered to the desired components of the fuel cell system.

Figure 1B:
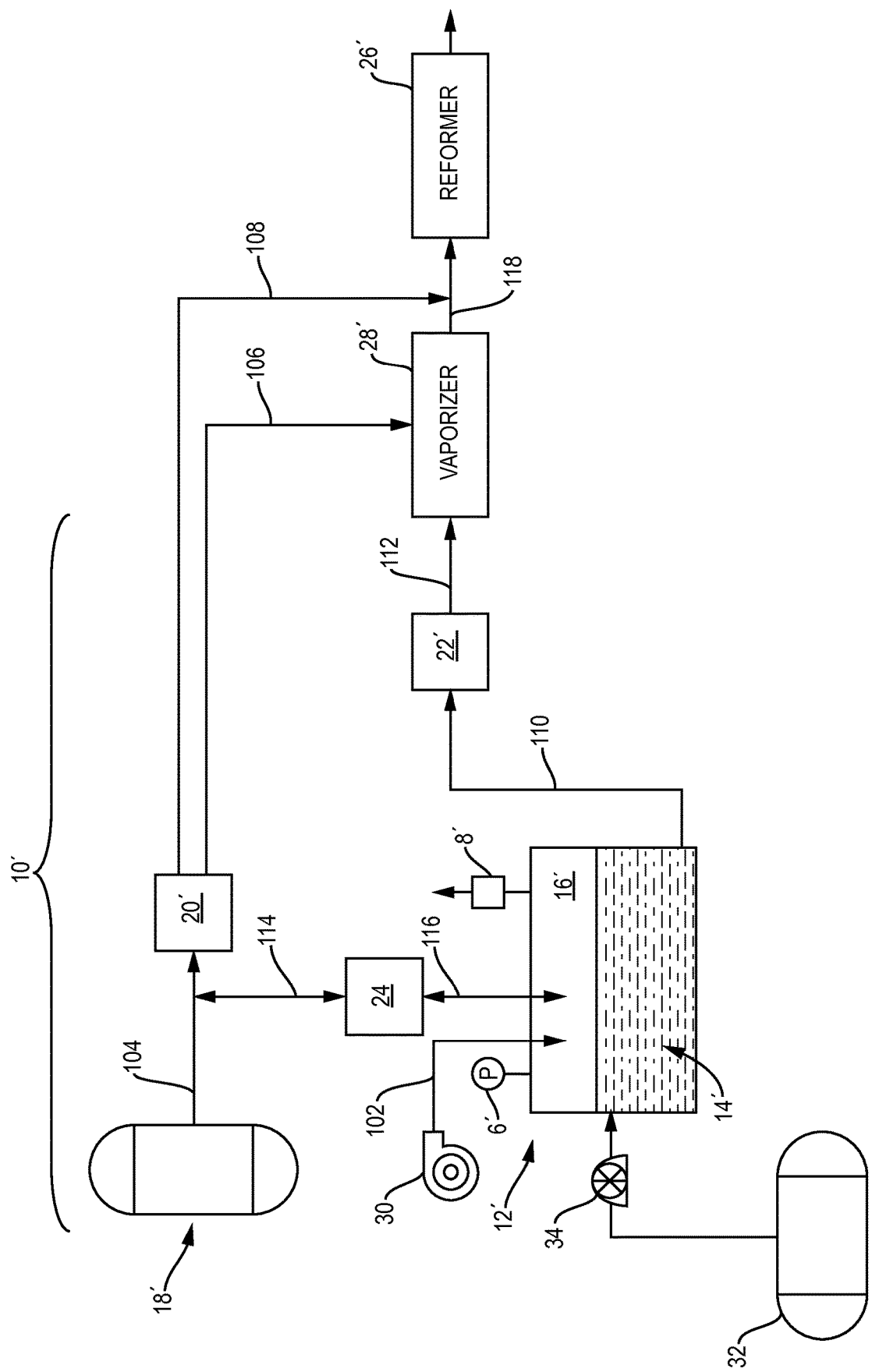
FIG. 1B is a schematic diagram of an embodiment of a liquid and gaseous reformable fuel delivery system of the present teachings where a source of positive gas pressure and a source of gaseous reformable fuel can be used to flow and deliver gaseous reformable fuel and liquid reformable fuel through the delivery system, which includes three valve assemblies.

FIG. 1B is a schematic diagram of an embodiment of a liquid and gaseous reformable fuel delivery system of the present teachings similar to the delivery system of FIG. 1A but including a source of positive gas pressure different from the source of gaseous reformable fuel. FIG. 1B also includes a primary source of liquid reformable fuel.

The similar components of figures can be the same or different, for example, having various modifications associated therewith such as materials of construction, sensor assemblies, valve configurations, conduit connections and arrangement, and the like.

Referring now to FIG. 1B, the liquid and gaseous reformable fuel delivery system 10' includes a liquid reformable fuel reservoir 12', where the interior of the liquid reformable fuel reservoir includes a liquid reformable fuel space 14' and a gaseous headspace 16'. The liquid reformable fuel space can include a liquid reformable fuel. The liquid reformable fuel reservoir 12' includes a pressure sensor assembly 6' and a pressure relief valve assembly 8'. The liquid and gaseous reformable fuel delivery system 10' also includes a source of gaseous reformable fuel 18', such as a canister or tank of propane, butane, natural gas, or other gaseous reformable fuel.

The depicted liquid and gaseous reformable fuel delivery system 10' includes a first valve assembly 20', a second valve assembly 22', and a third valve assembly 24. The first valve assembly 20' is operable to provide fluid communication between the source of gaseous reformable fuel 18' and a reformer 26' and optionally, between the source of gaseous reformable fuel 18' and at least one of a vaporizer 28', a fuel cell stack (not shown), and an afterburner (not shown). The second valve assembly 22' is operable to provide fluid communication between the liquid reformable fuel space 14' and the vaporizer 28'. The third valve assembly 24 is operable to provide fluid communication between the source of gaseous reformable fuel 18' and the gaseous headspace 16' of the liquid reformable fuel reservoir 12' and in the opposite direction, between the gaseous headspace 16' and the reformer 26' and the vaporizer 28' (and a fuel cell stack and/or an afterburner (not shown)) through the first valve assembly 20'. Each of the first, second, third valve assemblies can include an on/off valve, which can assist in ceasing the delivery of a gaseous reformable fuel and/or liquid reformable fuel.

The liquid and gaseous reformable fuel delivery system 10' also includes a source of positive gas pressure 30 different from the source of gaseous reformable fuel 18'. The source of positive gas pressure 30 is in operable fluid communication with the gaseous headspace 16' of the liquid reformable fuel reservoir 12'. The fluid communication between the source of positive gas pressure and the gaseous headspace can be controlled by a valve assembly (not shown), by other pressure control means such as a pressure chamber, or by control features associated with the source of positive gas pressure. The pressure relief valve assembly can be used to control or can assist in controlling the pressure of the gaseous headspace.

As mentioned above, a pressure chamber (not shown) can be positioned between the source of positive gas pressure and the gaseous headspace, where the pressure chamber can act as a control for the delivery of gas into the gaseous headspace and permit an appropriate pressure to be attained in the gaseous headspace to displace and deliver liquid reformable fuel from the liquid reformable fuel reservoir to the vaporizer. Such a pressure chamber can have a pressure relief valve assembly and/or pressure sensor associated therewith.

Returning to FIG. 1B, peripheral to the delivery system 10' is a primary source of liquid reformable fuel 32 in fluid communication with the liquid reformable fuel space 14' of the liquid reformable fuel reservoir 12'. The primary source of liquid reformable fuel can refill the liquid reformable fuel reservoir. A pump 34, for example, a liquid pump, can be used to deliver liquid reformable fuel from the primary source of liquid reformable fuel 32 to the liquid reformable fuel space 14'.

Depending on the particular application and the fuel cell system, the primary source of liquid reformable fuel can be maintained in an attached position until the liquid reformable fuel has been depleted or nearly depleted from the source of liquid reformable fuel, or the primary source of liquid reformable fuel can be attached only during a (re) filling process, for example, only when liquid reformable fuel is being delivered into the liquid reformable fuel reservoir. In the latter case, a quick release valve attachment (not shown) can be effectively used to couple the primary source of liquid reformable fuel with the liquid reformable fuel reservoir.

Use of such a larger source of liquid reformable fuel can permit refilling of a liquid reformable fuel reservoir from the larger source of liquid reformable fuel. Such refilling can be advantageous for continuous operation of a fuel cell system or for refilling a portable/mobile fuel cell system. Such refilling also can avoid the introduction into the gaseous stream through a fuel cell system of sediment and other high density impurities in the liquid reformable fuel within the liquid reformable fuel reservoir as the liquid reformable fuel reservoir does not need to be used until it is empty and can be refilled from a larger source of liquid reformable fuel thereby introducing less impurities into the liquid reformable fuel reservoir.

FIG. 1B includes identification of conduits that can be present between or among the various components of the delivery system and peripheral to it. Now referring to FIG. 1B to exemplify a delivery system including specific conduits connecting the components, a source of positive gas pressure conduit 102 can provide operable fluid communication between the source of positive gas pressure 30 and the headspace of liquid reformable fuel reservoir 16', where the source of positive gas pressure conduit can couple an outlet of the source of positive gas pressure to an inlet of the liquid reformable fuel reservoir.

A source of gaseous reformable fuel conduit 104 can provide operable fluid communication between the source of gaseous reformable fuel 18' and the first valve assembly 20', where the source of gaseous reformable fuel conduit can couple an outlet of the source of gaseous reformable fuel to an inlet of the first valve assembly. The first valve assembly 20' also has a vaporizer conduit 106 and a reformer conduit 108. The vaporizer conduit can couple an outlet of the first valve assembly to an inlet of the vaporizer (as shown). The reformer conduit can couple another outlet of the first valve assembly to an inlet of a vaporizer-reformer conduit 118 (as shown), or with an inlet of the reformer (not shown).

A liquid reformable fuel conduit 110 can provide operable fluid communication between the liquid reformable fuel space 14' and the second valve assembly 22', where the liquid reformable fuel conduit can couple an outlet of the liquid reformable fuel reservoir to an inlet of the second valve assembly. The second valve assembly 22' has a second liquid reformable fuel conduit 112, where the second liquid fuel conduit can couple an outlet of the second valve assembly to an inlet of the vaporizer. Here is an example where the liquid reformable fuel conduit 110 and the second liquid reformable fuel conduit 112 can be considered to be a single conduit with the second valve assembly 22' in-line with, situated within, or associated with the single conduit.

Still referring to FIG. 1B, a gaseous conduit 114 can provide operable fluid communication between the source of gaseous reformable fuel 18' (via the source of gaseous reformable fuel conduit 104) and the third valve assembly 24, where the gaseous conduit can couple a port of the source of gaseous reformable fuel conduit to a port of the third valve assembly. The third valve assembly 24 also has a second gaseous conduit 116, where the second gaseous conduit can couple a port of the third valve assembly to a port of the liquid reformable fuel reservoir. The port of the liquid reformable fuel reservoir that is in fluid communication with the source of gaseous reformable fuel is in fluid communication with the headspace of the liquid reformable fuel reservoir.

A vaporizer-reformer conduit 118 can provide operable fluid communication between the vaporizer 28' and the reformer 26', where the vaporizer-reformer conduit can couple an outlet of the vaporizer to an inlet of the reformer. As should be understood, the coupling of a vaporizer to a reformer also can include other structure and components, such as a fluid mixing device, a valve assembly and various sensors.

Figure 1C:
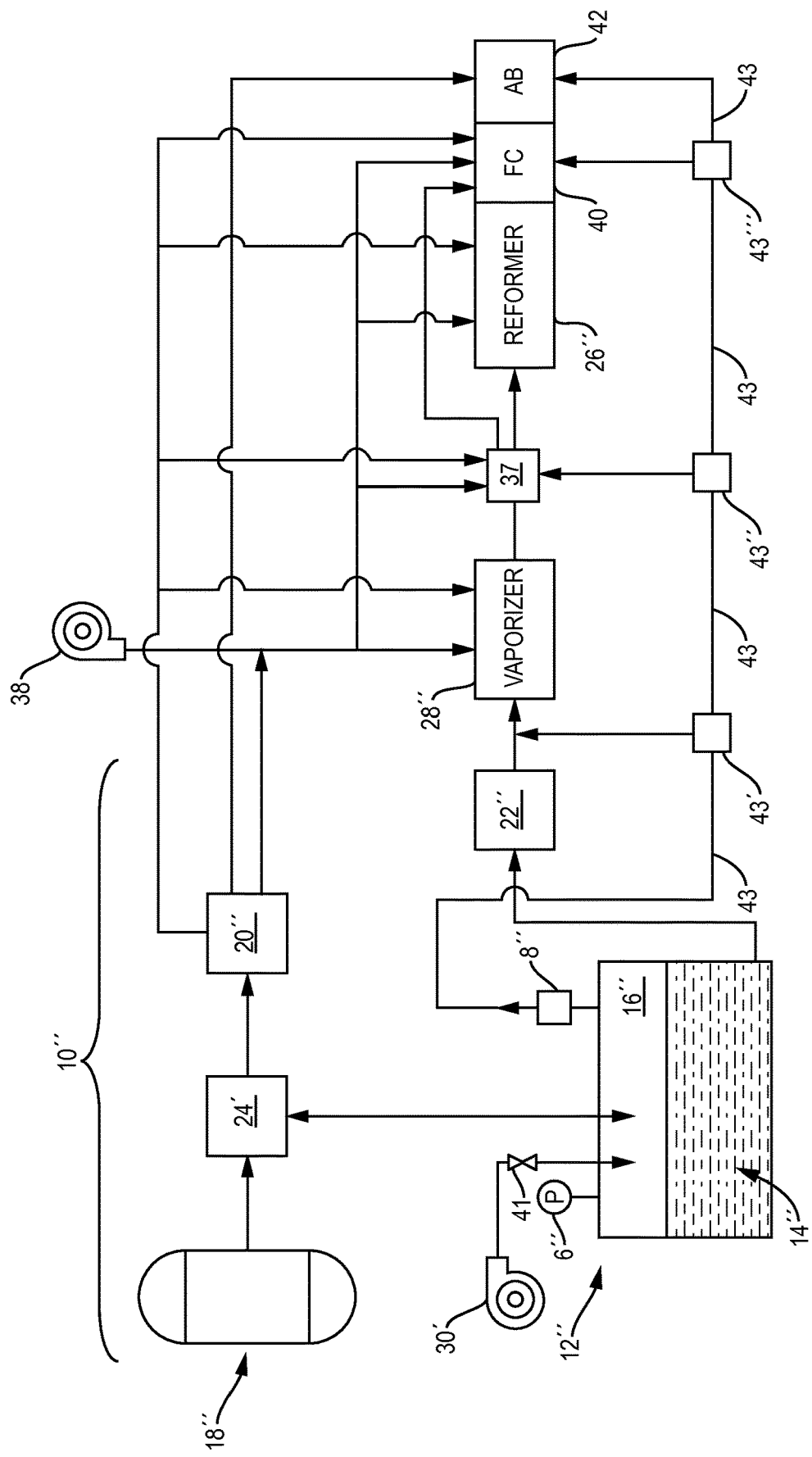
FIG. 1C is a schematic diagram of an embodiment of a liquid and gaseous reformable fuel delivery system of the present teachings including a source of oxygen-containing gas and operable fluid communication between or among the gaseous headspace and one or more downstream components of a fuel cell unit or system via a pressure relief valve assembly, where the delivery system is associated with a fuel cell unit or system including an afterburner.

FIG. 1C is a schematic diagram of an embodiment of a liquid and gaseous reformable fuel delivery system of the present teachings that is associated with a fuel cell unit or system. FIG. 1C also includes a source of oxygen-containing gas.

Referring now to FIG. 1C, the liquid and gaseous reformable fuel delivery system 10" includes a liquid reformable fuel reservoir 12", where the interior of the liquid reformable fuel reservoir includes a liquid reformable fuel space 14" and a gaseous headspace 16". The liquid reformable fuel space can include a liquid reformable fuel. The liquid reformable fuel reservoir 12" includes a pressure sensor assembly 6" and a pressure relief valve assembly 8". The liquid and gaseous reformable fuel delivery system 10" also includes a source of gaseous reformable fuel 18", such as a canister or tank of propane, butane, natural gas, or other gaseous reformable fuel.

The depicted liquid and gaseous reformable fuel delivery system 10" includes a first valve assembly 20", a second valve assembly 22", and a third valve assembly 24'. The first valve assembly 20" is operable to provide fluid communication between the source of gaseous reformable fuel 18" through the third valve assembly 24' to a vaporizer 28", a fluid mixing device 37, a reformer 26" (directly or through the fluid mixing device 37), and a fuel cell stack 40. The conduit(s) from the first valve assembly to the each of these components can be positioned such that the gaseous reformable fuel is introduced into an inlet of the component or into a conduit leading to one of the components, for example, to the vaporizer from the liquid reformable fuel reservoir, either before or after the second valve assembly. The first valve assembly 20" also is operable to provide fluid communication directly between the source of gaseous reformable fuel 18" through the third valve assembly 24' to an afterburner 42, by-passing the vaporizer and the reformer.

In addition, the first valve assembly 20" is operable to provide fluid communication between the source of gaseous reformable fuel 18" through the third valve assembly 24' to a conduit from a source of oxygen-containing gas 38 thereby to mix a gaseous reformable fuel with an oxygen-containing gas such as air prior to introduction to one or more of the vaporizer 28", the fluid mixing device 37, the reformer 26", and the fuel cell stack 40.

In much the same way as each of the first and third valve assemblies is operable to provide fluid communication between and/or among the source of gaseous reformable fuel and other components of a fuel cell unit, the first and third valve assemblies can be manipulated with the other valve assemblies and components of the fuel cell system to provide fluid communication between the gaseous headspace of the liquid reformable fuel reservoir and at least one of the vaporizer, the fluid mixing device, the reformer, the fuel cell stack, and the afterburner as described herein. In this case, the positive pressure from the source of positive gas pressure can deliver the gas from the gaseous headspace through the third valve assembly to the first valve assembly, which can distribute the gas to the desired component(s) of the fuel cell unit.

Alternately or in combination, a dedicated conduit system can be used to achieve essentially the same purpose without requiring the gas from the gaseous headspace to be routed through the first and third valve assemblies. As shown in FIG. 1C, a gaseous headspace conduit 43 can provide fluid communication between or among the gaseous headspace 16" and one or more components of a delivery system and/or fuel cell unit and/or system via the pressure relief valve assembly 8".

More specifically, the gaseous headspace conduit 43 can provide fluid communication between or among the gaseous headspace 16" and the vaporizer 28" (through a valve assembly 43' and the conduit leading into the vaporizer), the fluid mixing device 37 (through the valve assemblies 43', 43"), the reformer 26" (through the valve assemblies 43', 43" and the fluid mixing device 37, or through a valve assembly directly to the reformer by-passing the fluid mixing device (not shown)), the fuel cell stack 40 (through the valve assemblies 43', 43", 43''') and the afterburner 42 (through the valve assemblies 43', 43", 43''').

As should be realized, the depicted structure and routing can be altered by removing, adding and/or repositioning the conduits, valve assemblies, sensor assemblies, and other components and structure without changing the function of permitting the gas from the gaseous headspace, which gas can include at least one of vaporized liquid reformable fuel (e.g., the vapor of the liquid reformable fuel in the gaseous headspace), a gaseous reformable fuel and an oxygen-containing gas, to be used in other components of the fuel cell unit or system. In such a fashion, the gas from the gaseous headspace can be used to supplement the oxygen-containing gas needed for a gaseous reforming reaction mixture and/or to consume reformable fuel present in the gaseous headspace to create electricity and/or heat thereby increasing the energy efficiency of the process.

The second valve assembly 22" is operable to provide fluid communication between the liquid reformable fuel space 14" and the vaporizer 28". The third valve assembly 24' is operable to provide fluid communication between the source of gaseous reformable fuel 18" and the gaseous headspace 16" of the liquid reformable fuel reservoir 12" and between gaseous headspace 16" and the reformer 26" and the vaporizer 28" through the first valve assembly 20".

In such a configuration, the first and third valve assemblies can be considered to be a single valve assembly, for example, the first valve assembly, where the function(s) of the third valve assembly can be included in the first valve assembly. However, the first and third valve assemblies are detailed and described separately in this exemplary embodiment for ease of understanding of the control and delivery of gaseous reformable fuel in the delivery systems of the present teachings.

Returning to FIG. 1C, the liquid and gaseous reformable fuel delivery system 10" also includes a source of positive gas pressure 30' different from the source of gaseous reformable fuel 18". The source of positive gas pressure 30' is in operable fluid communication with the gaseous headspace 16" of the liquid reformable fuel reservoir 12" through an on/off valve 41. The operation of the delivery system of FIG. 1C is generally similar to that of the embodiment depicted in FIG. 1B. However, in addition, the source of positive gas pressure can drive the gas and its constituents from the gaseous headspace of the liquid reformable fuel reservoir through the pressure relief valve to one or more of the various components downstream therefrom to avoid venting such gas and its constituents without using their beneficial properties for the efficient operation of the fuel cell unit or system.

As shown in FIG. 1C, peripheral to the liquid and gaseous reformable fuel delivery system 10" is a fluid mixing device 37, which is operable to provide fluid communication between the vaporizer 28" and the reformer 26" and/or the fuel cell stack 40. That is, an outlet of the fluid mixing device can be in operable fluid communication with the reformer or directly with the fuel cell stack, for example, for on-cell reforming. The fluid mixing device 37 is in operable fluid communication with the source of gaseous reformable fuel 18" through the first valve assembly 20" and the third valve assembly 24'. In addition, the fluid mixing device 37 is in operable fluid communication with a source of oxygen-containing gas 38.

The source of oxygen-containing gas 38 also is in operable fluid communication with the source of gaseous reformable fuel 18", the vaporizer 28", the reformer 26", and the fuel cell stack 40. As discussed herein, an oxygen-containing gas, such as air, can be mixed with a gaseous reformable fuel and/or a gaseous liquid reformable fuel (e.g., from the vaporizer) to create a gaseous reforming reaction mixture such as a gaseous CPOX reaction mixture, which then can be delivered to the reformer and/or the fuel cell stack for a reforming reaction. The reformable fuel and an oxygen-containing gas can be mixed prior to introduction to a component or within the component of a delivery system and/or fuel cell unit or system.

For example, an oxygen-containing gas from the source of oxygen-containing gas can be delivered directly to the vaporizer (e.g., an inlet of a vaporizer) or to (a conduit containing) the vaporized liquid reformable fuel (e.g., through the fluid mixing device 37) prior to entering the reformer and/or the fuel cell stack. The oxygen-containing gas can be delivered to at least one of the vaporizer, the conduit containing vaporized liquid reformable fuel, the fluid mixing device, the reformer, and the fuel cell stack without first mixing with a gaseous reformable fuel, for example, when the delivery system is directing or delivering only liquid reformable fuel to the vaporizer. The source of oxygen-containing gas can provide a secondary source of an oxygen-containing gas for example, air, to adjust the oxygen to fuel ratio prior to reforming the fuel, whether in the reformer and/or in the fuel cell stack.

FIG. 1C also includes a fuel cell unit or system, for example, a solid oxide fuel cell unit or system, which is coupled to the delivery system. The fuel cell unit or system includes a fuel cell stack 40 in fluid communication with the reformer 26" and with an afterburner 42. The afterburner can be in fluid communication with an exhaust outlet (not shown) of the fuel cell stack. In addition, an exhaust outlet of the afterburner can be in thermal communication with one or more of the liquid reformable fuel, the vaporizer, the reformer, and the fuel cell stack. In such an arrangement, the heat from the afterburner can be used to heat other components of the fuel cell system including the liquid reformable fuel prior to vaporization. Likewise, the fuel cell stack and/or reformer can be in thermal communication with each other and/or the liquid reformable fuel and the vaporizer to permit thermal management of the fuel cell system.

Figure 1D:
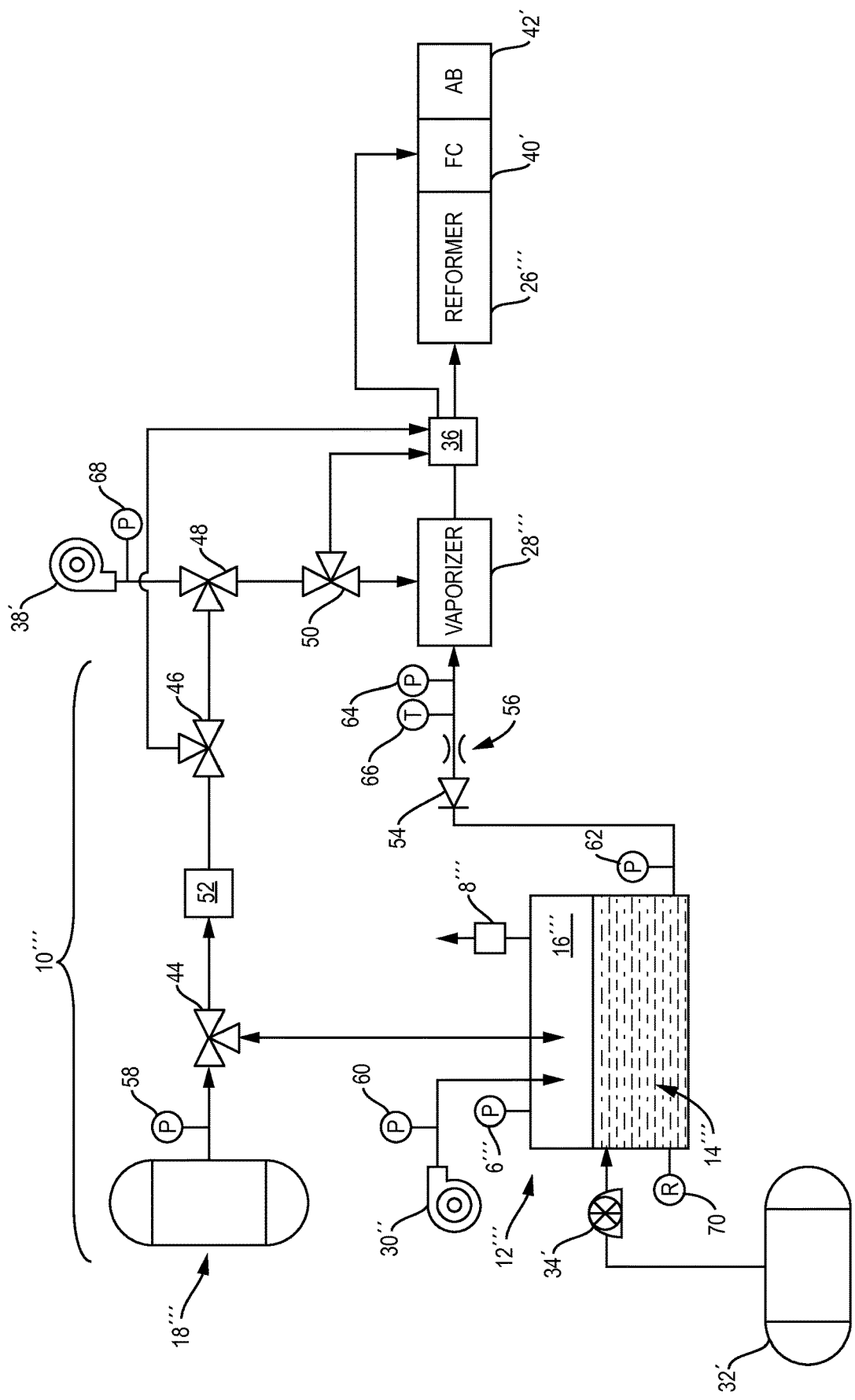
FIG. 1D is a schematic diagram of an embodiment of a liquid and gaseous reformable fuel delivery system of the present teachings including a primary source of liquid reformable fuel and a source of oxygen-containing gas, where the delivery system is associated with a fuel cell unit or system including an afterburner.

FIG. 1D is a schematic diagram of an embodiment of a liquid and gaseous reformable fuel delivery system of the present teachings and a source of oxygen-containing gas and a primary source of liquid reformable fuel, where the delivery system is associated with a fuel cell unit or system including an afterburner.

Referring now to FIG. 1D, the liquid and gaseous reformable fuel delivery system 10''' includes a liquid reformable fuel reservoir 12''', where the interior of the liquid reformable fuel reservoir includes a liquid reformable fuel space 14''' and a gaseous headspace 16'''. The liquid reformable fuel space can include a liquid reformable fuel. The liquid reformable fuel reservoir 12''' includes a pressure sensor assembly 6''' and a pressure relief valve assembly 8'''. The liquid and gaseous reformable fuel delivery system 10''' includes a source of gaseous reformable fuel 18''', such as a canister or tank of propane, butane, natural gas, or other gaseous reformable fuel.

The liquid and gaseous reformable fuel delivery system 10''' also includes a source of positive gas pressure 30'' different from the source of gaseous reformable fuel 18'''. The source of positive gas pressure 30'' is in operable fluid communication with the gaseous headspace 16''' of the liquid reformable fuel reservoir 12'''.

The depicted liquid and gaseous reformable fuel delivery system 10''' includes four three-way valves 44, 46, 48, 50, a metering or proportional valve 52, a check valve 54, and an orifice 56. Where the delivery system includes three valve assemblies as described herein, the three-way valve 44 closest to the source of gaseous reformable fuel 18''' can be considered to be the third valve assembly and the adjacent metering or proportional valve 52 and the three-way valve 46 can be considered to be the first valve assembly. Alternatively, the three-way valves 44, 46 and the metering or proportional valve 52 can be considered to be the first valve assembly where the delivery system includes two valve assemblies as discussed herein and in particular reference to FIG. 1A. The check valve 54 and the orifice 56 can be considered to be the second valve assembly in a two, three or higher order valve assembly delivery system. Accordingly, the operation of the delivery system of FIG. 1D is generally similar to that of the embodiments depicted in FIGS. 1B and 1C and is not discussed in further detail.

The embodiment shown in FIG. 1D also includes pressure sensors, for example, including feed pressure verification (on/off) sensors and fuel flow differential pressure gauges. Pressure relief valves also can be associated with the pressure sensors. Referring to FIG. 1D, a pressure sensor 58 is associated with the source of gaseous reformable fuel 18'''. A pressure sensor 60 is associated with the source of positive gas pressure 30''. A pressure sensor 62 is associated with an outlet of the liquid reformable fuel reservoir, which outlet is in fluid communication with the liquid reformable fuel space 14'''. A pressure sensor 64 and a temperature sensor 66, for example, a fuel temperature sensor, is associated with the inlet area to the vaporizer 28'''.

Figure 1E:
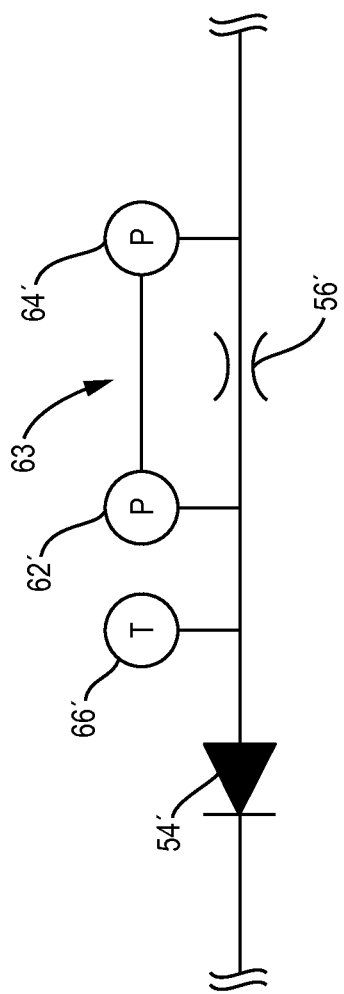
FIG. 1E is a schematic diagram of an embodiment of an arrangement of valve and sensor assemblies along a conduit from a liquid reformable fuel space to a vaporizer.

FIG. 1E depicts an alternate arrangement of the components along the conduit from the liquid reformable fuel reservoir to the vaporizer. As shown, where the left-hand side is from the liquid reformable fuel space or reservoir, heading in the downstream direction is a check valve assembly 54' (which also can be or include a proportional valve and/or a shutoff valve), a fuel temperature sensor 66', and a fuel flow pressure differential assembly 63 spans a valve assembly 56', which is shown as an orifice. In such an arrangement, the fuel flow pressure differential assembly includes pressure sensors 62', 64' so as to monitor and determine the different pressure and flow characteristics of the liquid reformable fuel being delivered through the conduit to the vaporizer (not shown but on the right-hand side of the figure).

As shown in FIG. 1D, peripheral to the liquid and gaseous reformable fuel delivery system 10''' is a fourth valve assembly 36, which is operable to provide fluid communication between the vaporizer 28''' and the reformer 26'''. The fourth valve assembly 36 is in operable fluid communication with the source of gaseous reformable fuel 18''' through the three-way valves 44, 46 and the metering or proportional valve 52. In addition, the fourth valve assembly 36 is in operable fluid communication with a source of oxygen-containing gas 38' via three-way valves 48, 50. A pressure sensor 68 is associated with the source of oxygen-containing gas 38'. The source of oxygen-containing gas 38' also is in operable fluid communication with the vaporizer 28''' and with the source of gaseous reformable fuel 18''' via the depicted structure and components.

As in FIG. 1B, FIG. 1D includes a primary source of liquid reformable fuel 32' in fluid communication with the liquid reformable fuel space 14''' of the liquid reformable fuel reservoir 12''' for refilling the liquid reformable fuel reservoir 12'''. A pump 34', for example, a liquid pump, can be used to deliver liquid reformable fuel from the primary source of liquid reformable fuel 32' to the liquid reformable fuel space 14'''. A refill sensor 70 is associated with the liquid reformable fuel space 14'''. The refill sensor can include one or more of a fuel-full sensor, a refill sensor, and an out-of-fuel sensor.

FIG. 1D also includes a fuel cell unit/system that is coupled to the delivery system. The fuel cell unit/system includes a fuel cell stack 40' in fluid communication with the reformer 26''' and with an afterburner 42'. The afterburner can be in fluid communication with an exhaust outlet of the fuel cell stack (not shown). The afterburner, the fuel cell stack, and/or the reformer can be in thermal communication with each other and/or other components as described for FIG. 1C.

Figure 1F:
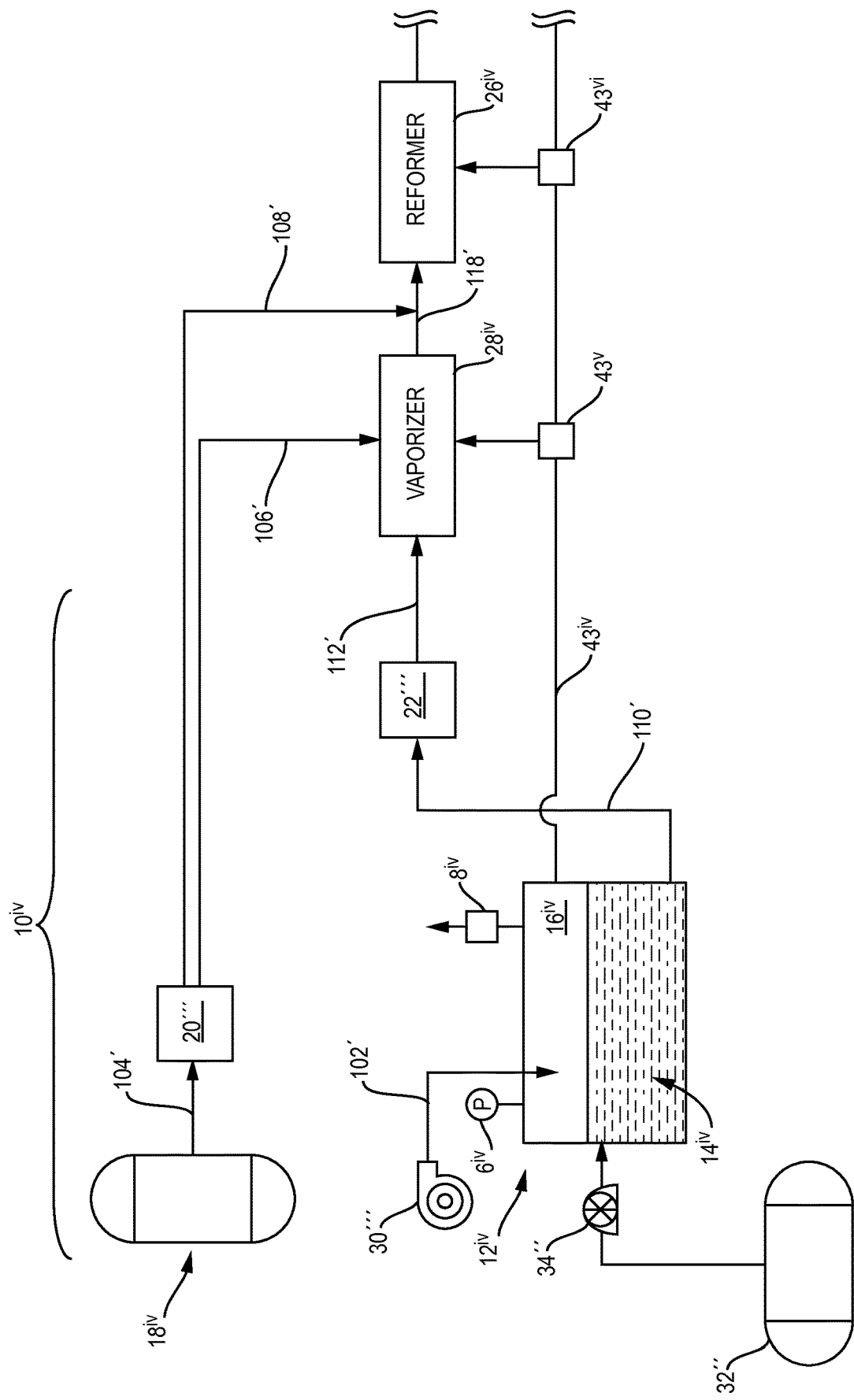
FIG. 1F is a schematic diagram of an embodiment of a liquid and gaseous reformable fuel delivery system of the present teachings similar to FIG. 1B but excluding a valve assembly and conduit(s) directly linking the source of gaseous reformable fuel with the gaseous headspace of the liquid reformable fuel reservoir and including operable fluid communication between or among the gaseous headspace and one or more downstream components of a fuel cell unit or system.

FIG. 1F is a schematic diagram of an embodiment of a liquid and gaseous reformable fuel delivery system of the present teachings similar to FIG. 1B but excluding a valve assembly and conduit(s) directly linking the source of gaseous reformable fuel with the gaseous headspace of the liquid reformable fuel reservoir. In addition, the depicted liquid delivery system includes operable fluid communication between or among the gaseous headspace and one or more downstream components of a fuel cell unit or system such as a vaporizer, a reformer, a fuel cell stack, and an afterburner.

Referring now to FIG. 1F, the liquid and gaseous reformable fuel delivery system $10^{iv}$ includes a liquid reformable fuel reservoir $12^{iv}$, where the interior of the liquid reformable fuel reservoir includes a liquid reformable fuel space $14^{iv}$ and a gaseous headspace $16^{iv}$. The liquid reformable fuel space can include a liquid reformable fuel. The liquid reformable fuel reservoir $12^{iv}$ includes a pressure sensor assembly $6^{iv}$ and a pressure relief valve assembly $8^{iv}$. The liquid and gaseous reformable fuel delivery system $10^{iv}$ also includes a source of gaseous reformable fuel $18^{iv}$, such as a canister or tank of propane, butane, natural gas, or other gaseous reformable fuel.

The depicted liquid and gaseous reformable fuel delivery system $10^{iv}$ includes a first valve assembly 20''' and a second valve assembly 22'''. The first valve assembly 20''' is operable to provide fluid communication between the source of gaseous reformable fuel $18^{iv}$ and at least one of a vaporizer $28^{iv}$, a reformer $26^{iv}$ (e.g., via a conduit in fluid communication with an inlet of the reformer), a fuel cell stack (not shown), and an afterburner (not shown). The second valve assembly 22' is operable to provide fluid communication between the liquid reformable fuel space $14^{iv}$ and the vaporizer $28^{iv}$ and/or a fluid mixing device (not shown).

Although the source of gaseous reformable fuel is not in operable fluid communication with the gaseous headspace of the liquid reformable fuel reservoir as in FIG. 1B, a source of positive gas pressure $30'''$ is in operable fluid communication with the gaseous headspace $16^{iv}$ of the liquid reformable fuel reservoir $12^{iv}$. In such an arrangement, the source of positive gas pressure can be the sole source of gas to pressurize the gaseous headspace to displace and deliver a liquid reformable fuel from the liquid reformable fuel space to a vaporizer and/or a fluid mixing device.

The source of positive gas pressure $30'''$ also can displace and deliver gas present in the gaseous headspace $16^{iv}$ to one or more components of a fuel cell unit or system such as a vaporizer $28^{iv}$, a reformer $26^{iv}$, a fuel cell stack (not shown) and an afterburner (not shown). Depending on the adjustment of the gas pressure from the source of positive gas pressure $30'''$, and adjustment of the pressure relief valve assembly $8^{iv}$, the second valve assembly $22'''$, and a valve assembly $43^{v}$ associated with a gaseous headspace conduit $43^{iv}$, liquid reformable fuel from the liquid reformable fuel space $14^{iv}$ and/or gas from the gaseous headspace $16^{iv}$ can be delivered to the vaporizer $28^{iv}$ and/or a fluid mixing device.

More specifically, the gaseous headspace conduit $43^{iv}$ can provide fluid communication between or among the gaseous headspace $16^{iv}$ and one or more of the vaporizer $28^{iv}$ (through a valve assembly $43^{v}$), and the reformer $26^{iv}$ (through a valve assembly $43^{vi}$), a fuel cell stack (not shown), and an afterburner (not shown). As described herein, the venting or bleeding of gas from the gaseous headspace, which gas can include one or more of vapor of liquid reformable fuel, an oxygen-containing gas and other energy-producing reactants, to one or more components of a fuel cell unit or system can increase the energy efficiency of the overall unit or system.

As in FIG. 1B, FIG. 1F includes identification of conduits that can be present between or among the various components of the delivery system and peripheral to it. Now referring to FIG. 1F, a source of positive gas pressure conduit $102'$ can provide operable fluid communication between the source of positive gas pressure $30'''$ and the headspace of liquid reformable fuel reservoir $16^{iv}$, where the source of positive gas pressure conduit can couple an outlet of the source of positive gas pressure to an inlet of the liquid reformable fuel reservoir.

A source of gaseous reformable fuel conduit $104'$ can provide operable fluid communication between the source of gaseous reformable fuel $18'$ and the first valve assembly $20'''$, where the source of gaseous reformable fuel conduit can couple an outlet of the source of gaseous reformable fuel to an inlet of the first valve assembly. The first valve assembly $20'''$ also has a vaporizer conduit $106'$ and a reformer conduit $108'$, similar to those shown in FIG. 1B. The reformer conduit $108'$ can couple another outlet of the first valve assembly to an inlet of a vaporizer-reformer conduit $118'$ (as shown), or with an inlet of the reformer (not shown).

The vaporizer-reformer conduit $118'$ can provide operable fluid communication between the vaporizer $28^{iv}$ and the reformer $26^{iv}$, where the vaporizer-reformer conduit can couple an outlet of the vaporizer to an inlet of the reformer. As should be understood, the coupling of a vaporizer to a reformer also can include other structure and components, such as a fluid mixing device, a valve assembly and various sensors.

A liquid reformable fuel conduit $110'$ can provide operable fluid communication between the liquid reformable fuel space $14^{iv}$ and the second valve assembly $22'''$, where the liquid reformable fuel conduit can couple an outlet of the liquid reformable fuel reservoir to an inlet of the second valve assembly. The second valve assembly $22'''$ has a second liquid reformable fuel conduit $112'$, where the second liquid fuel conduit can couple an outlet of the second valve assembly to an inlet of the vaporizer. Here is another example where the liquid reformable fuel conduit $110'$ and the second liquid reformable fuel conduit $112'$ can be considered to be a single conduit with the second valve assembly $22'''$ in-line with, situated within, or associated with the single conduit.

As in FIG. 1B, FIG. 1F includes a primary source of liquid reformable fuel $32''$ in fluid communication with the liquid reformable fuel space $14^{iv}$ of the liquid reformable fuel reservoir $12^{iv}$. A pump $34''$ such as a liquid pump can be used to deliver liquid reformable fuel from the primary source of liquid reformable fuel $32''$ to the liquid reformable fuel space $14^{iv}$.

Figure 1G:
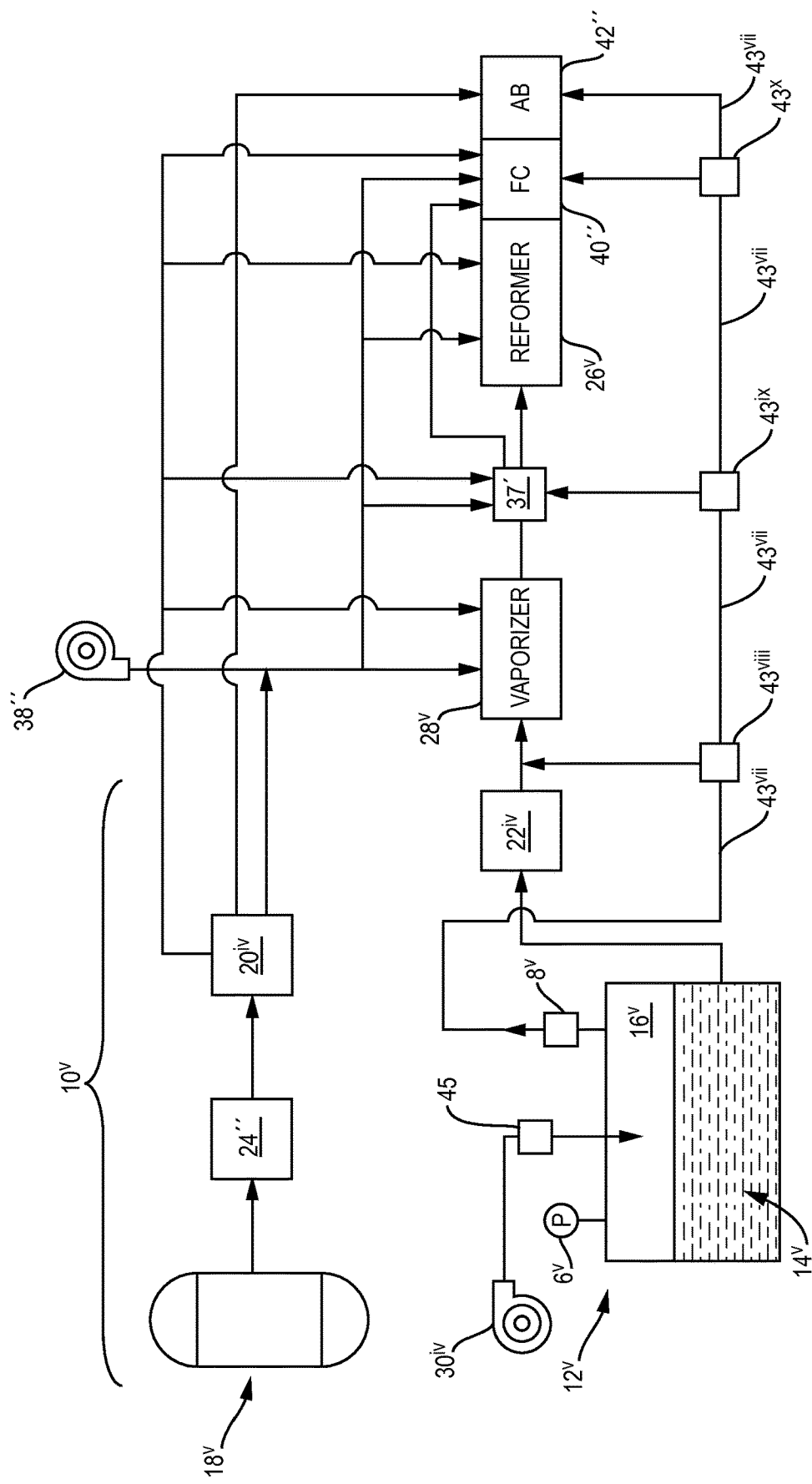
FIG. 1G is a schematic diagram of an embodiment of a liquid and gaseous reformable fuel delivery system of the present teachings similar to FIG. 1C but excluding a conduit directly linking the source of gaseous reformable fuel with the gaseous headspace of the liquid reformable fuel reservoir.

FIG. 1G is a schematic diagram of an embodiment of a liquid and gaseous reformable fuel delivery system of the present teachings similar to FIG. 1C but excluding a conduit directly linking the source of gaseous reformable fuel with the gaseous headspace of the liquid reformable fuel reservoir. In addition, the delivery system depicted in FIG. 1G is similar to the delivery system depicted in FIG. 1F in that the source of positive gas pressure in operable fluid communication with the gaseous headspace of the liquid reformable fuel reservoir is the sole source of gas to pressurize the gaseous headspace.

Referring now to FIG. 1G, the liquid and gaseous reformable fuel delivery system $10'$ includes a liquid reformable fuel reservoir $12^{v}$, where the interior of the liquid reformable fuel reservoir includes a liquid reformable fuel space $14'$ and a gaseous headspace $16^{v}$. The liquid reformable fuel space can include a liquid reformable fuel. The liquid reformable fuel reservoir $12^{v}$ includes a pressure sensor assembly $6^{v}$ and a pressure relief valve assembly $8^{v}$. The liquid and gaseous reformable fuel delivery system $10^{v}$ also includes a source of gaseous reformable fuel $18^{v}$.

The depicted liquid and gaseous reformable fuel delivery system $10^{v}$ includes a first valve assembly $20^{iv}$, a second valve assembly $22^{iv}$, and a third valve assembly $24''$. The first valve assembly $20^{iv}$ is operable to provide fluid communication between the source of gaseous reformable fuel $18^{v}$ through the third valve assembly $24''$ to a vaporizer $28^{v}$, a fluid mixing device $37'$, a reformer $26^{v}$ (directly or through the fluid mixing device $37'$), and a fuel cell stack $40''$. The first valve assembly $20^{iv}$ also is operable to provide fluid communication directly between the source of gaseous reformable fuel $18^{v}$ through the third valve assembly $24''$ to an afterburner $42''$, by-passing the vaporizer and the reformer.

In addition, the first valve assembly $20''$ is operable to provide fluid communication between the source of gaseous reformable fuel $18^{v}$ through the third valve assembly $24''$ to a conduit from a source of oxygen-containing gas $38''$ thereby to mix a gaseous reformable fuel with an oxygen-containing gas prior to introduction to one or more of the vaporizer $28^{v}$, the fluid mixing device $37'$, the reformer $26^{v}$, and the fuel cell stack $40''$.

The liquid and gaseous reformable fuel delivery system $10'$ includes a source of positive gas pressure $30^{iv}$ in operable fluid communication with the gaseous headspace $16^{v}$ of the liquid reformable fuel reservoir $12^{v}$ through a valve assembly $45$. The operation of the delivery system of FIG. 1G is generally similar to that of the embodiment depicted in FIG. 1F. However, the source of positive gas pressure can drive the gas and its constituents from the gaseous headspace of the liquid reformable fuel reservoir through the pressure relief valve to one or more of the various components downstream therefrom to avoid bleeding or venting such gas and its constituents without potential benefit.

More specifically, the gaseous headspace conduit $43^{vii}$ can provide fluid communication between or among the gaseous headspace $16^v$ and the vaporizer $28^v$ (through a valve assembly $43^{viii}$ and the conduit leading into the vaporizer), the fluid mixing device $37'$ (through the valve assemblies $43^{viii}$, $43^{ix}$), the reformer $26^v$ (through the valve assemblies $43^{viii}$, $43^{ix}$ and the fluid mixing device $37'$, or through a valve assembly directly to the reformer by-passing the fluid mixing device (not shown)), the fuel cell stack $40''$ (through the valve assemblies $43^{viii}$, $43^{ix}$, $43^x$) and the afterburner $42''$ (through the valve assemblies $43^{viii}$, $43^{ix}$, $43^x$).

Figure 2:
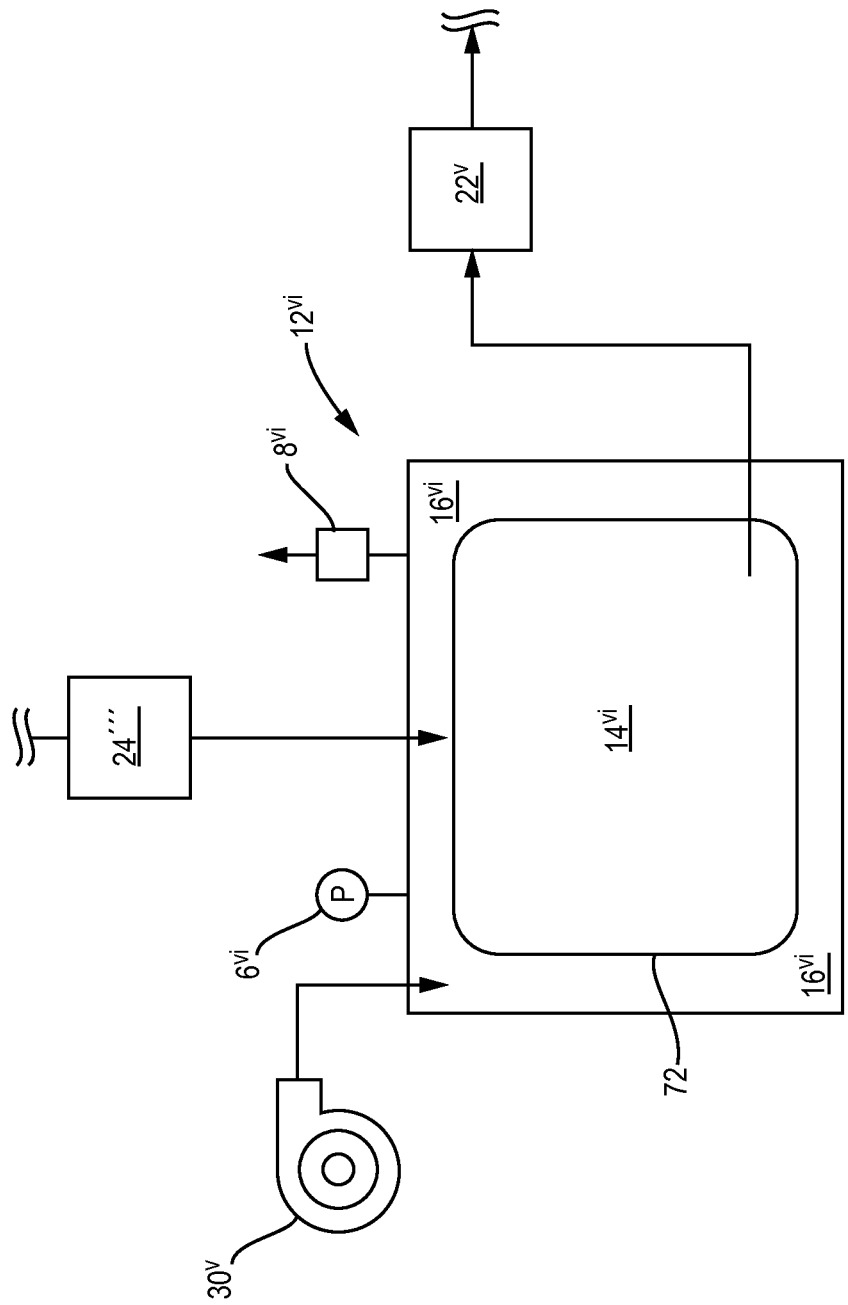
FIG. 2 is a schematic diagram, in relevant part, of an embodiment of a liquid reformable fuel reservoir that includes a bladder.

FIG. 2 is a schematic diagram of a liquid reformable fuel space defined by a bladder or similar structure that can be operated independent of the orientation of the liquid reformable fuel reservoir. As shown, the liquid reformable fuel reservoir $12^{vi}$ includes a liquid reformable fuel space $14^{vi}$ that is defined by bladder $72$. The liquid reformable fuel reservoir $12^{vi}$ includes a pressure sensor assembly $6^{vi}$ and a pressure relief valve assembly $8^{vi}$. The liquid reformable fuel reservoir $12^{vi}$ also includes in its interior a gaseous headspace $16^{vi}$. As with other embodiments, the gaseous headspace $16^{vi}$ is in fluid communication with a source of positive gas pressure $30^v$. As shown, the gaseous headspace $16^{vi}$ also is in fluid communication with a source of gaseous reformable fuel (not shown) through a third valve assembly $24'''$. The liquid reformable fuel space $14^{vi}$ is in fluid communication with a vaporizer (not shown) via a second valve assembly $22^v$.

In operation, gas pressure in the gaseous headspace created by the source of positive gas pressure and/or the source of gaseous reformable fuel can displace a liquid reformable fuel from the bladder through an outlet of the liquid reformable fuel reservoir to the second valve assembly. The pressure in the gaseous headspace can be controlled, in whole or in part, with the use of the pressure relief valve assembly. When the amount of liquid reformable fuel in the bladder is reduced to an unusable level, the bladder can be refilled using a primary source of liquid reformable fuel and the appropriate connections (not shown) to the interior of the bladder. Alternatively, the liquid reformable fuel reservoir can be replaced with a liquid reformable fuel reservoir having a bladder full or substantially full of liquid reformable fuel, or with a more conventional liquid reformable fuel reservoir as depicted in FIGS. 1A-1D, 1F and 1G.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is:

1. A liquid and gaseous reformable fuel delivery system for a fuel cell unit or system, the system comprising:
    a liquid reformable fuel reservoir, wherein the interior of the liquid reformable fuel reservoir comprises a liquid reformable fuel space and a gaseous headspace and the liquid reformable fuel space is in operable fluid communication with a vaporizer of a fuel cell unit;
    a pressure relief valve assembly in operable fluid communication with the gaseous headspace of the liquid reformable fuel reservoir; and
    a source of a gaseous reformable fuel, wherein the source of a gaseous reformable fuel is in operable fluid communication with the gaseous headspace of the liquid reformable fuel reservoir, and in operable fluid communication with at least one of a vaporizer, a reformer, and a fuel cell stack of a fuel cell unit.

2. The liquid and gaseous reformable fuel delivery system of claim 1, comprising a source of positive gas pressure different from the source of gaseous reformable fuel, wherein the source of positive gas pressure is in operable fluid communication with the gaseous headspace of the liquid reformable fuel reservoir.

3. The liquid and gaseous reformable fuel delivery system of claim 2, the delivery system comprising:
    a first valve assembly operable to provide fluid communication between or among the source of a gaseous reformable fuel and at least one of the vaporizer, the reformer, and the fuel cell stack, and between the source of gaseous reformable fuel and the gaseous headspace of the liquid reformable fuel reservoir; and
    a second valve assembly operable to provide fluid communication between the liquid reformable fuel space and the vaporizer.

4. The liquid and gaseous reformable fuel delivery system of claim 3, the delivery system comprising:
    a third valve assembly operable to provide fluid communication between the source of gaseous reformable fuel and the gaseous headspace of the liquid reformable fuel reservoir,
        wherein the first valve assembly is operable to provide fluid communication between or among the source of gaseous reformable fuel and at least one of the vaporizer, the reformer, and the fuel cell stack.

5. A method of operating the liquid and gaseous reformable fuel delivery system of claim 1, the method comprising:
    adjusting the gas pressure of the gaseous headspace of the liquid reformable fuel reservoir and from the source of gaseous reformable fuel, to control the delivery of gaseous reformable fuel from the source of gaseous reformable fuel to at least one of a vaporizer, a reformer, and a fuel cell stack, and the delivery of liquid reformable fuel from the liquid reformable fuel reservoir to a vaporizer.

6. A method of operating the liquid and gaseous reformable fuel delivery system of claim 4, the method comprising:
    adjusting the pressure relief valve assembly, the first valve assembly, the second valve assembly, and the third valve assembly, to control the delivery of gaseous reformable fuel from the source of gaseous reformable fuel to at least one of a vaporizer, a reformer, and a fuel cell stack, and the delivery of liquid reformable fuel from the liquid reformable fuel reservoir to a vaporizer.

7. The method of claim 5, comprising delivering gas from the gaseous headspace of the liquid reformable fuel reservoir to at least one of a vaporizer, a reformer, and a fuel cell stack.

* * * * *